United States Patent
Mauro et al.

(10) Patent No.: US 6,721,081 B1
(45) Date of Patent: Apr. 13, 2004

(54) VARIABLE DUTY CYCLE OPTICAL PULSES

(75) Inventors: John C. Mauro, Corning, NY (US); Srikanth Raghavan, Ithaca, NY (US); Sergey Y. Ten, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 23 days.

(21) Appl. No.: 10/256,453

(22) Filed: Sep. 26, 2002

(51) Int. Cl.⁷ .............................................. G02B 21/00
(52) U.S. Cl. ...................... 359/279; 359/239; 359/245
(58) Field of Search ................................ 359/279, 239, 359/245, 276, 238; 385/2, 3; 398/183, 186, 188; 372/12, 26, 29.015

(56) References Cited

U.S. PATENT DOCUMENTS

| | | | |
|---|---|---|---|
| 6,262,828 B1 | 7/2001 | Akiyama et al. | 359/237 |
| 6,278,539 B1 | 8/2001 | Ooi et al. | 359/237 |
| 6,341,031 B1 | 1/2002 | McBrien et al. | 359/237 |
| 6,407,845 B2 | 6/2002 | Nakamoto | 359/239 |
| 6,621,617 B1 * | 9/2003 | Poggiolini | 359/279 |
| 2001/0053165 A1 | 12/2001 | Wang et al. | 372/38.02 |

FOREIGN PATENT DOCUMENTS

EP        1217425 A1    6/2002

OTHER PUBLICATIONS

"Reduction of Pulse–to–Pulse Interaction Using Alternative RZ Formats in 40–Gb/s Systems" Cheng, et al IEEE Photonics Technology Letters, vol. 14, No. 1 Jan. 1, 2002.

"Investigation of cross–phase modulation in WDM systems with NRZ and RZ modulation formats" Yu, et al Optics Communications 184(2000) 367–373.

"Reduced Driving Voltage Optical Duobinary Transmitter and Its Impact on Transmission Performance Over Standard Single–Mode Fiber" Gene, et al IEEE Photonics Technology Letters, vol. 14, No. 6, Jun. 2002.

"Return–to–Zero Modulator Using a Single NRZ Drive Signal and an Optical Delay Interfermoter", Winzer, et al IEEE Photonics Technology Letters, vol. 13, No. 12, Dec. 2001.

"Feasibility of OOK modulation with RZ pulses of variable duty cycle in indoor unguided optical links at high bit rates" Garcia–Zambrana, et al 0–7803–4788–9/98 1998 IEEE.

WX2 "Enhancement in Performance of Long–Haul DWDM systems via Optimization of the Transmission Format" Kovsh, et al Wednesday Afternoon/ OFC 2002 361–362.

\* cited by examiner

*Primary Examiner*—Scott J. Sugarman
*Assistant Examiner*—Richard Hanig
(74) *Attorney, Agent, or Firm*—Juliana Agon

(57) ABSTRACT

A device (16) in a system (10) modulates an optical signal (13) and tunes the duty cycle of the optical signal (13) for optimizing system performance as a response of the duty cycle. The device (16) includes a tunable duty-cycle Mach-Zehnder interferometer (MZI) acting as a pulse-width shaper (160) for modulating the optical signal (13) and tuning the duty cycle of the optical signal (13). The MZI (160) has a transmittance transfer function of the interferometer (160). At least one electrode structure (163) generates a DC voltage and an AC voltage for biasing and controlling the swing of the Mach-Zehnder interferometer (160) with the respective amplitudes of the DC and AC voltages such that the maximum power transmittance point on the transfer function is less than 100% for tuning the duty cycle of the optical signal (13) such that system performance is optimized.

20 Claims, 24 Drawing Sheets

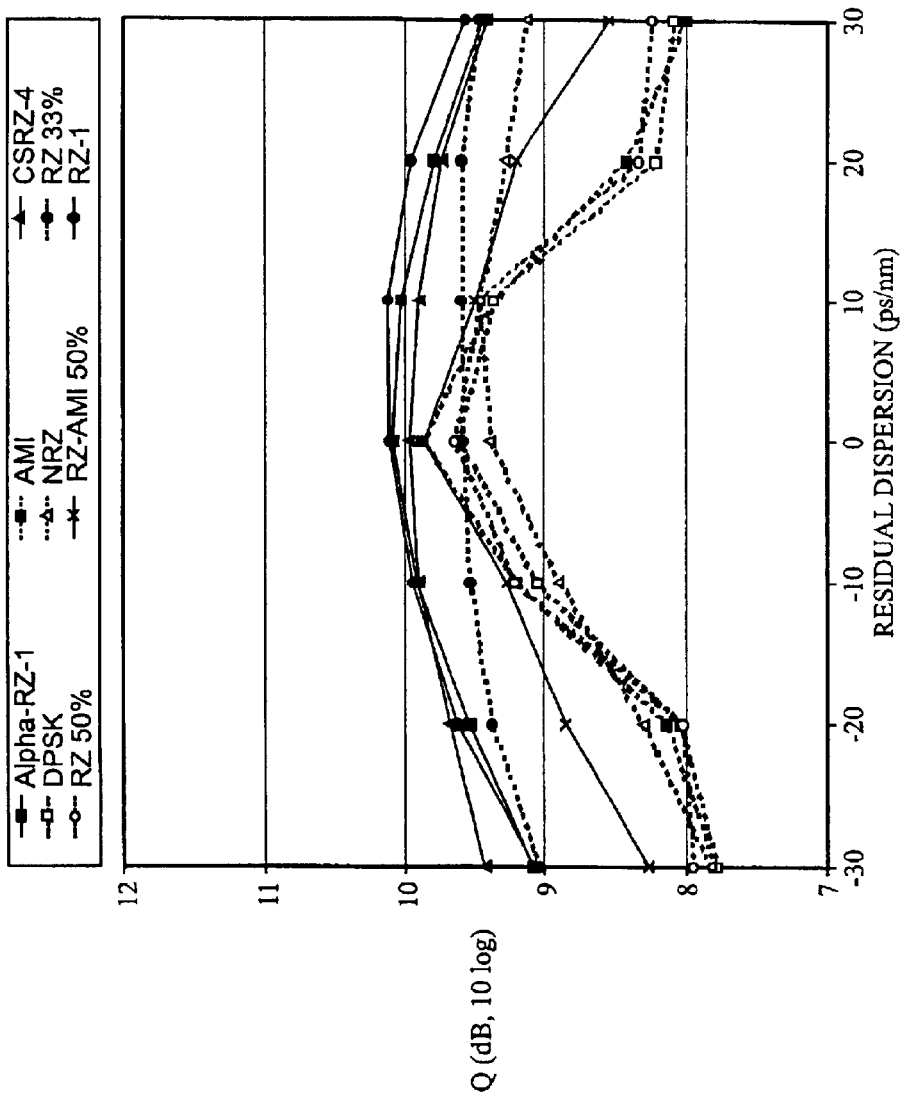
FIG. 12  FORMATS LAUNCHED WITH -1 dBm AVERAGE POWER PER CHANNEL

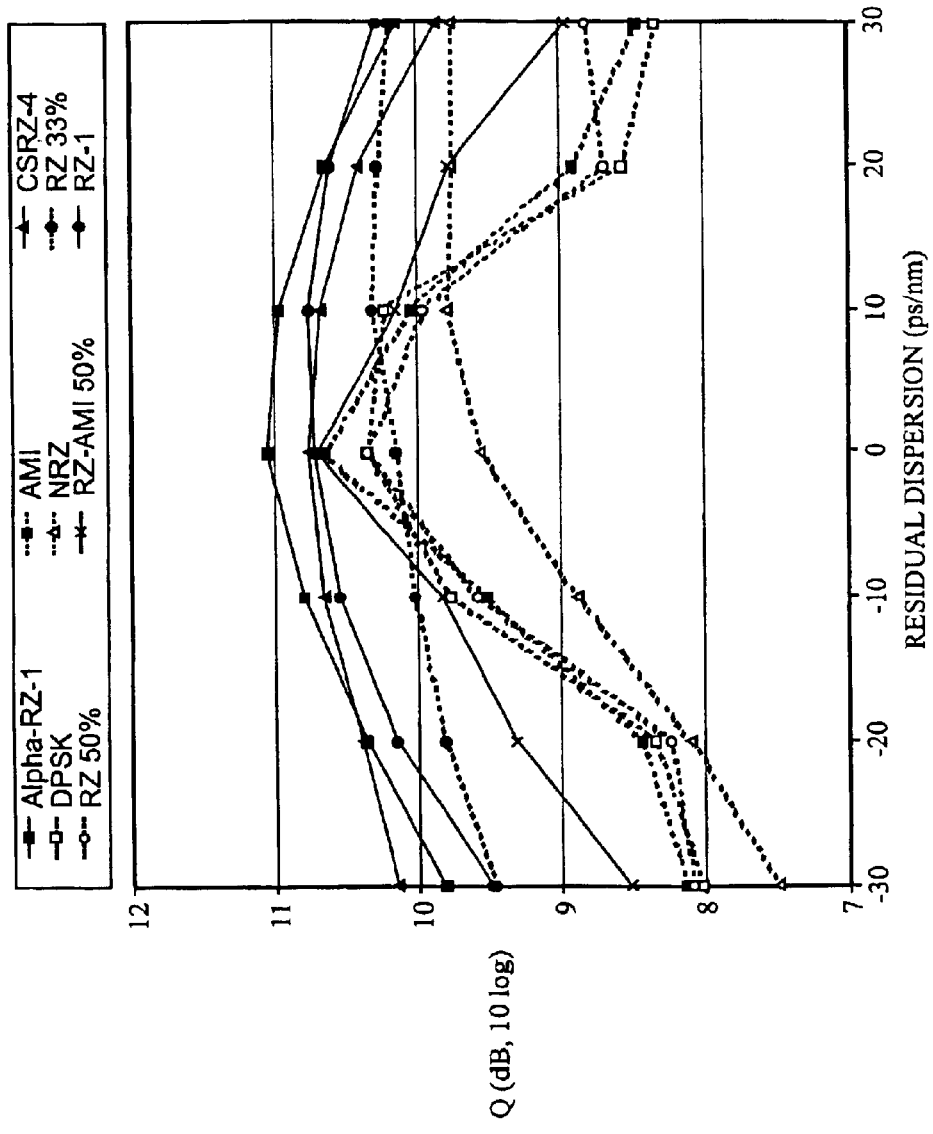
FIG. 13  FORMATS LAUNCHED WITH 1 dBm AVERAGE POWER PER CHANNEL

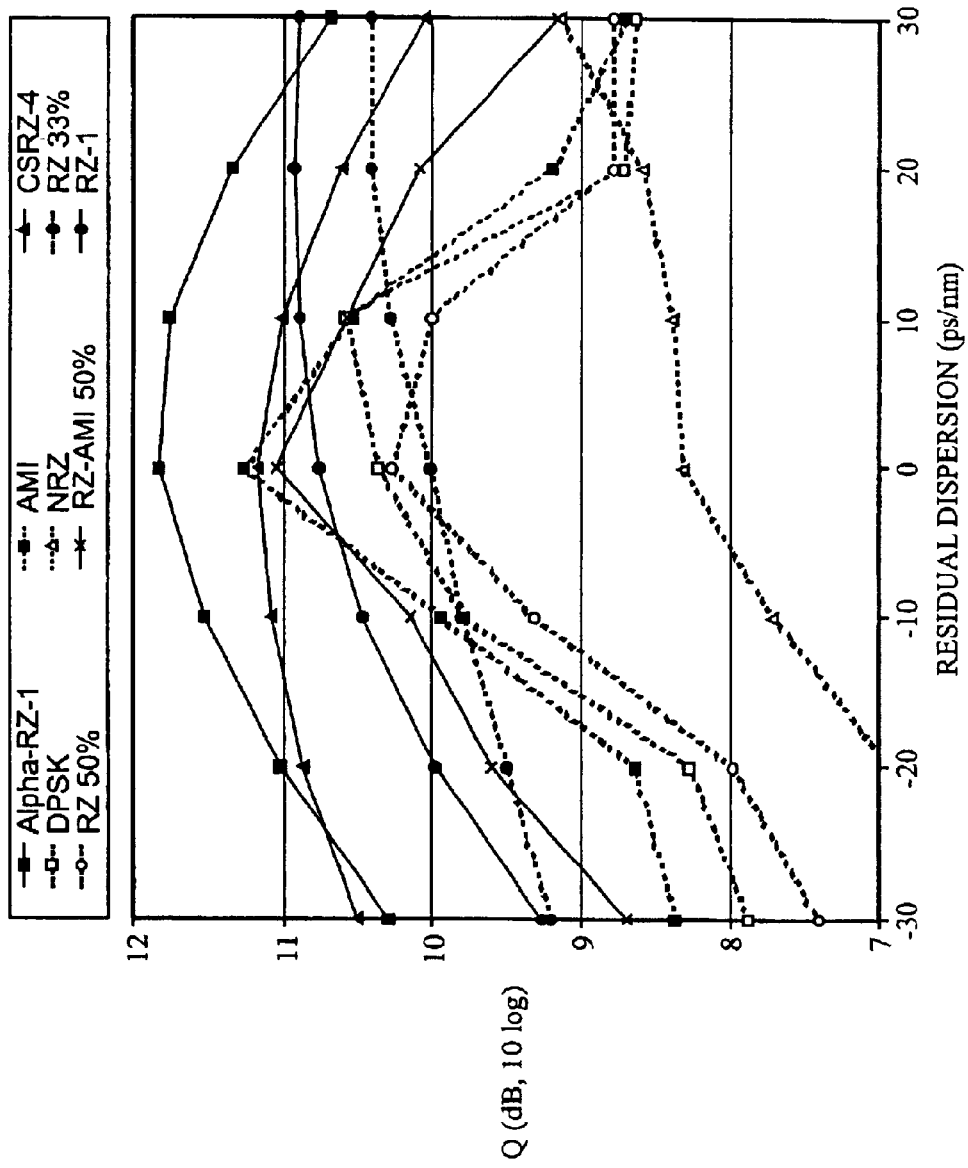
FIG. 14  FORMATS LAUNCHED WITH 3 dBm AVERAGE POWER PER CHANNEL

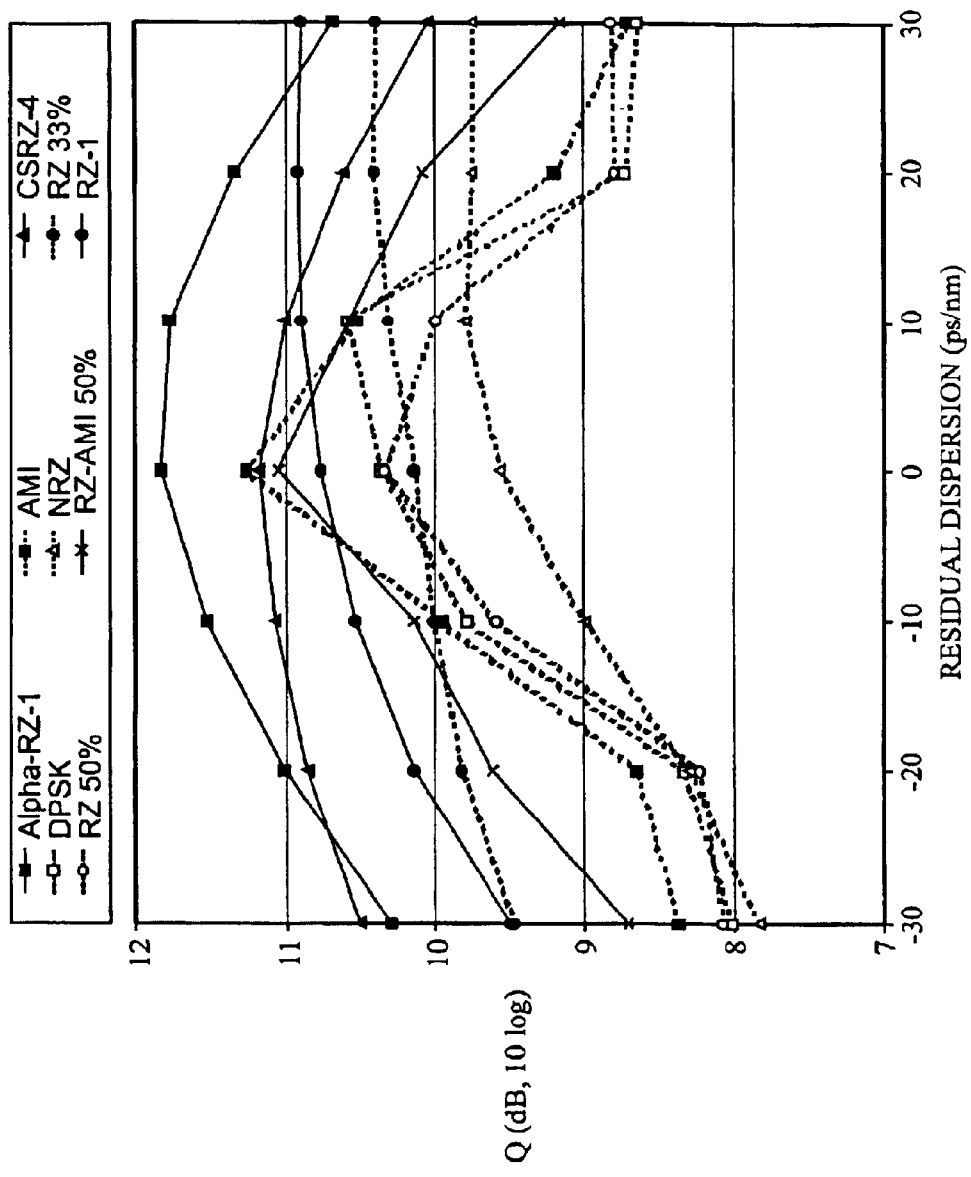
FIG. 15 FORMATS OPTIMIZED OVER-ALL POWER LEVELS

FIG. 23A MODULATOR DRIVE VOLTAGES, ASSUMING CHIRP-FREE
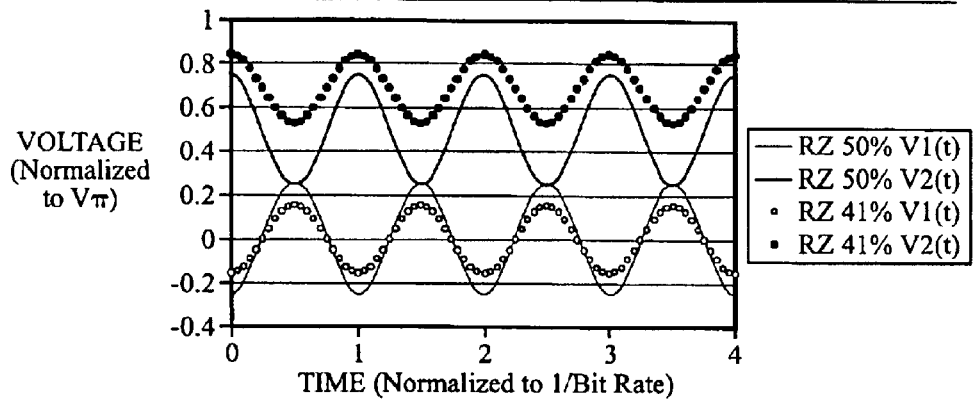
FIG. 23B MODULATOR DRIVE VOLTAGES, ASSUMING CHIRP-FREE
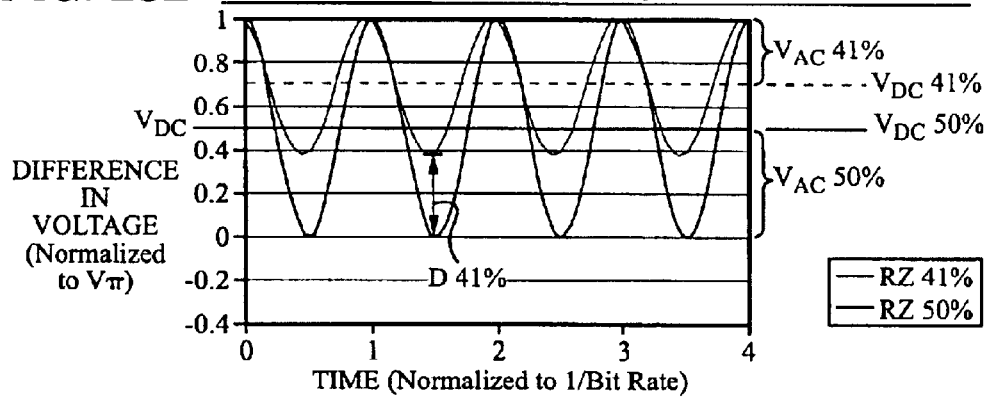
FIG. 23C EYE DIAGRAMS FOR RZ
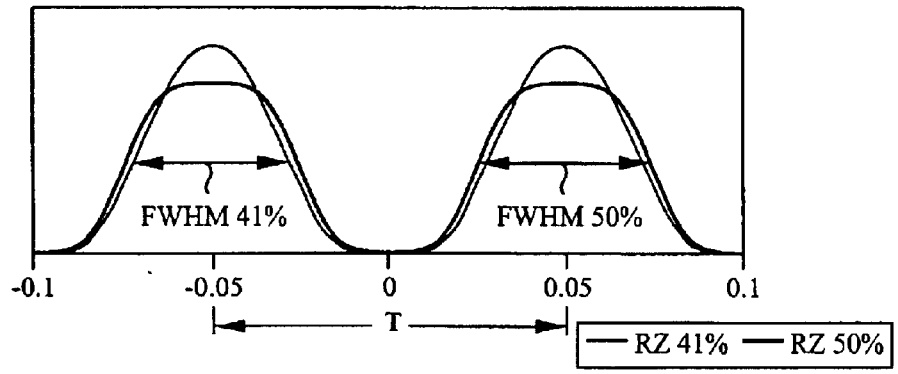

FIG. 25A (50%-50% CONCATENATION)
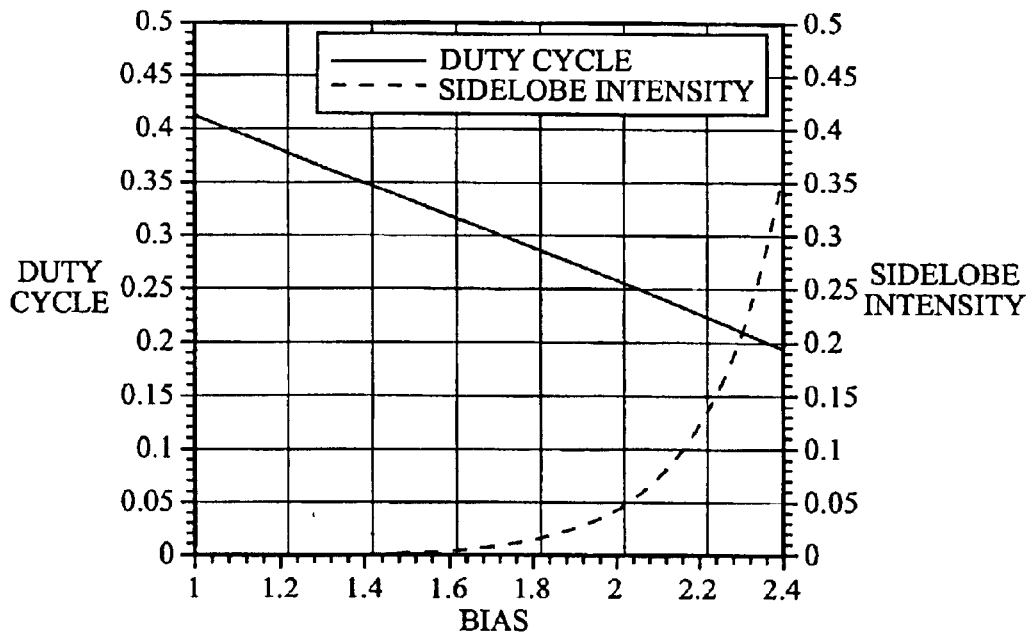
FIG. 25B (33%-50% CONCATENATION)
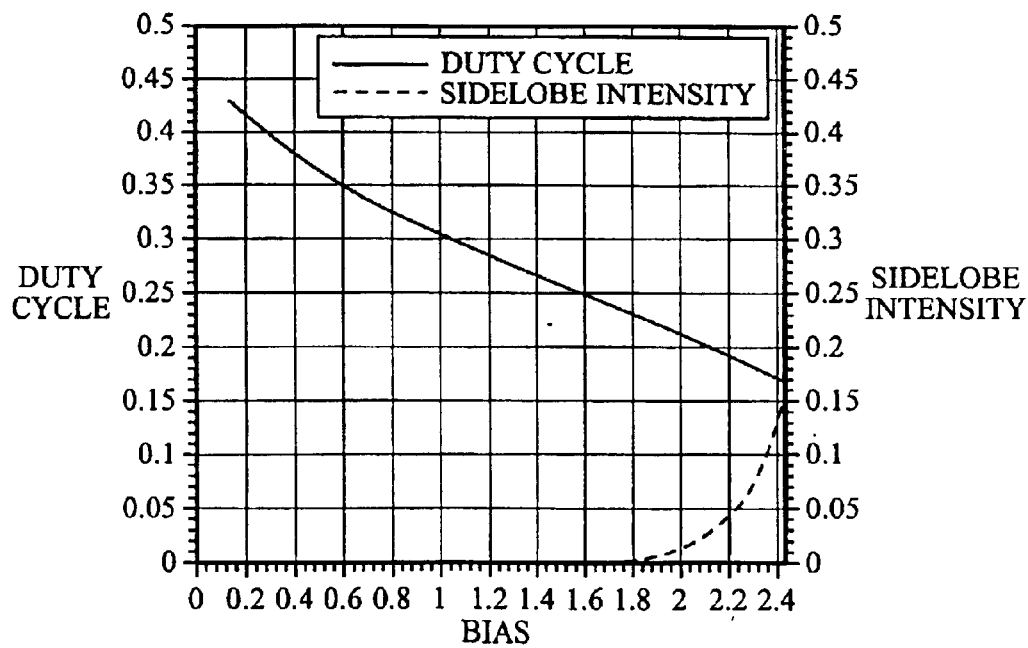

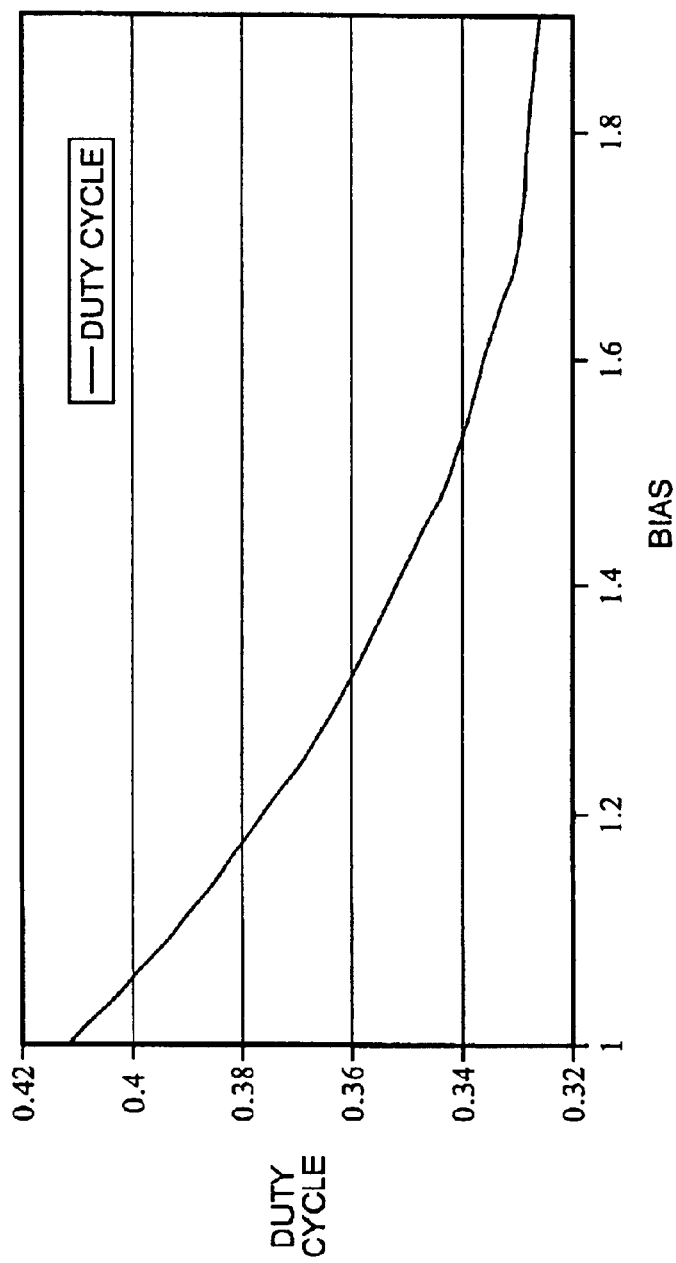
FIG. 28 RZ50-RZ50 CONCATENATION, FIRST RZ50 MZM FIXED, SECOND RZ50 BOTH BIAS AND SWING VARIED

VARIABLE DUTY CYCLE OPTICAL PULSES

CROSS-REFERENCE TO RELATED APPLICATIONS

This application relates to U.S. patent application Ser. No. 10/077,525 filed on Feb. 15, 2002.

BACKGROUND OF THE INVENTION

1. Field of the Invention

The present invention relates to electro-optic field modulators and in particular to using a Mach-Zehnder modulator for generating desired encoding or modulating formats to optimize the tunable duty cycle RZ pulses for optimizing system performance.

2. Technical Background

Current optical communication systems are characterized by high bit rates and complex channel and network architecture. Owing to the variety of power levels, dispersion maps, and system reach, the range and magnitude of system impairments due to both linear phenomena (such as dispersion and ASE) and nonlinear phenomena (such as self-phase modulation SPM, cross-phase modulation XPM, four-wave mixing FWM) can be quite significant. The choice of a modulation format has a significant impact on the interplay between the fiber and system parameters, particularly in the next generation of optical communication systems that will employ dense wavelength-division multiplexing (DWDM) and/or high bit rates of 40 Gb/s or even higher. For example, if the format is not optimized for a particular system, the optical pulses may be distorted such that the output optical signal is significantly degraded due to the appearance of side lobes on the edges of the pulses.

Nonlinear mixing of closely spaced pulse pairs generates undesired temporal side pulses or ghost pulses due to time domain four-wave mixing. The ghost pulses fall on the center of adjacent bit slots. As a result, the ghost pulses falling on the bit '1' or Mark pulses, cause amplitude jitter which is one of the dominant penalties at the high bit rates, such as 40 Gb/s or greater.

Generating return to zero (RZ) pulses with standard RZ or carrier suppressed RZ (CSRZ) are known. Standard modulation formats include non-return-to-zero (NRZ and return-to-zero (RZ) with 50% and 33% duty cycles. In general, the RZ modulation format has better performance than NRZ format in high-data-rate ultra-long-haul transmission systems and more robustness to nonlinearity impairments. This advantage, however, depends on several factors, including the appropriate balance of the launched power, the RZ pulse width (duty cycle), the optical and electrical filter bandwidths and the dispersion map. Variants of the RZ modulation format have also been proposed, including chirped-RZ (CRZ), carrier-suppressed RZ (CSRZ), differential phase shift keyed (DPSK), and duobinary.

Many have tried to optimize system performance. Variable duty cycle RZ pulses have been produced using an optical delay interferometer and are predicted to improve the bit error rate by about 2 dB. A reduction in the electrical driving voltage of a duobinary transmitter has been found in another approach to enhance the extinction ratio and improve the performance in standard single mode fiber. Even though the duty cycle was not discussed in yet another approach, the simulated optical spectrum shows a reduction in the intensity of the side lobes when the electrical driving voltage is reduced to 25%. However, there is no discussion of simultaneously tuning the bias voltage to optimize the shape of the duobinary pulses in this approach. It has been shown in a WDM experiment that optimizing pulse width of RZ pulses can suppress XPM penalties. Such various methods for tuning of the duty cycle show the benefit of duty cycle optimization.

Accordingly, there is a need to vary the duty cycle of different RZ modulation formats, in an improved manner, without increasing sidelobe intensities or other distortions to the optical output pulse.

BRIEF DESCRIPTION OF THE DRAWINGS

FIG. 12 is a comparison graph of Q factors of various modulation formats, including the solid line curves of variable duty cycles varied in accordance with the present invention and the standard dashed-line formats, as a function of residual dispersion for a 40 Gb/s system with 0.4 spectral efficiency where the launch power is −1 dBm per channel;

FIG. 13 is a comparison graph of Q factors of various modulation formats, including the solid line curves of variable duty cycles varied in accordance with the present invention and the standard dashed-line formats, as a function of residual dispersion for a 40 Gb/s system with 0.4 spectral efficiency where the launch power is +1 dBm per channel;

FIG. 14 is a comparison graph of Q factors of various modulation formats, including the solid line curves of variable duty cycles varied in accordance with the present invention and the standard dashed-line formats, as a function of residual dispersion for a 40 Gb/s system with 0.4 spectral efficiency where the launch power is +3 dBm per channel;

FIG. 15 is a comparison graph of optimized Q factors of various modulation formats, including the solid line curves of variable duty cycles varied in accordance with the present invention and the standard dashed-line-formats, as a function of residual dispersion for a 40 Gb/s system with 0.4 spectral efficiency where the launch power is optimized for all channels;

FIG. 23A is a graph of the modulator drive voltage signals applied to the two arms of the 50% pulse RZ modulator of FIG. 18 as compared to the 41% pulse RZ modulator of FIG. 20, in accordance with the present invention;

FIG. 23B is a graph of difference in modulator drive voltage signals of FIG. 23A applied to the two arms of the 50% pulse RZ modulator of FIG. 18 as compared to the 41% pulse RZ modulator of FIG. 20, in accordance with the present invention;

FIG. 23C is the eye diagram comparisons of resultant optical pulses from the 50% pulse RZ modulator of FIG. 18 as compared to the 41% pulse RZ modulator of FIG. 20, in accordance with the present invention;

FIG. 25A is a graph of variable RZ duty cycle as a function of the bias coefficient of one of the two concatenated MZI's of FIG. 5 formatted as RZ Mach-Zehnder modulators 20 and 160, such that only the bias coefficient of the modulator is varied in accordance with the present invention, the other RZ Mach-Zehnder modulator being formatted to generated 50% duty cycle RZ pulses;

FIG. 25B is a graph of variable RZ duty cycle as a function of the bias coefficient of one of the two concatenated MZIs of FIG. 5 formatted as RZ Mach-Zehnder modulators 20 and 160, such that only the bias coefficient of the modulator is varied in accordance with the present invention, the other RZ Mach-Zehnder modulator being formatted to generated 33% duty cycle RZ pulses;

FIG. 28 is a graph of variable RZ duty cycle as a function of the bias coefficient of one of the two concatenated MZIs of FIG. 5 formatted as RZ Mach-Zehnder modulators 20 and 160, such that both the bias coefficient and swing parameter of the modulator are varied in accordance with the present invention, the other RZ Mach-Zehnder modulator being formatted to generated 50% duty cycle RZ pulses.

DETAILED DESCRIPTION OF THE INVENTION

Figure 1:
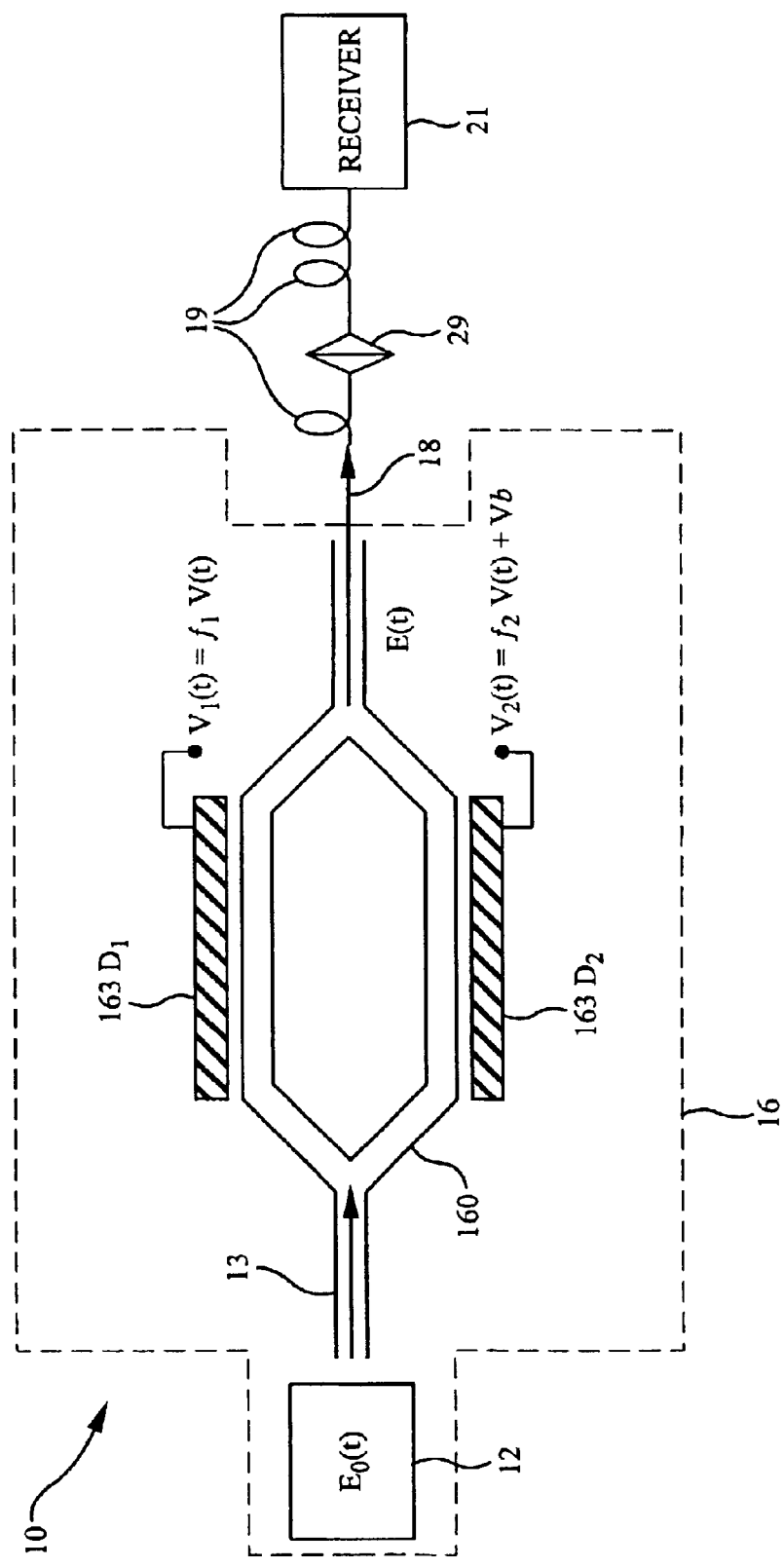
FIG. 1 is a schematic diagram of a Mach-Zehnder interferometer (MZI) used as pulse-width shaper 160 in a system 10 that can be formatted as an RZ or a CSRZ modulator, in accordance with the present invention.

Reference will now be made in detail to the present preferred embodiments of the invention, examples of which are illustrated in the accompanying drawings. Whenever possible, the same reference numerals will be used throughout the drawings to refer to the same or like parts.

Referring to FIG. 1, a device or apparatus 16 in a system 10 for modulating an optical signal 13 and tuning the duty cycle of the optical signal 13 for optimizing system performance as a response of the duty cycle is shown. The device 16 includes a tunable duty-cycle Mach-Zehnder interferometer (MZI) acting as a pulse-width shaper 160 for modulating the optical signal 13 and tuning the duty cycle of the optical signal 13. The MZI 160 has a transmittance transfer function of the interferometer 160. At least one electrode structure 163 generates a DC voltage and an AC voltage for biasing and controlling the swing of the Mach-Zehnder interferometer 160 with the respective amplitudes of the DC and AC voltages such that the maximum power transmittance point on the transfer function is less than 100% for tuning the duty cycle of the optical signal 13 such that system performance is optimized.

The device 16 thus formed can be used as an optical transmitter in the lightwave transmission system 10. An input source 12 that provides the optical signal 13 can be a laser for generating a continuous optical or continuous wave (CW) signal optical beam carried by an optical fiber for reception on the optical input 13.

Figure 2:
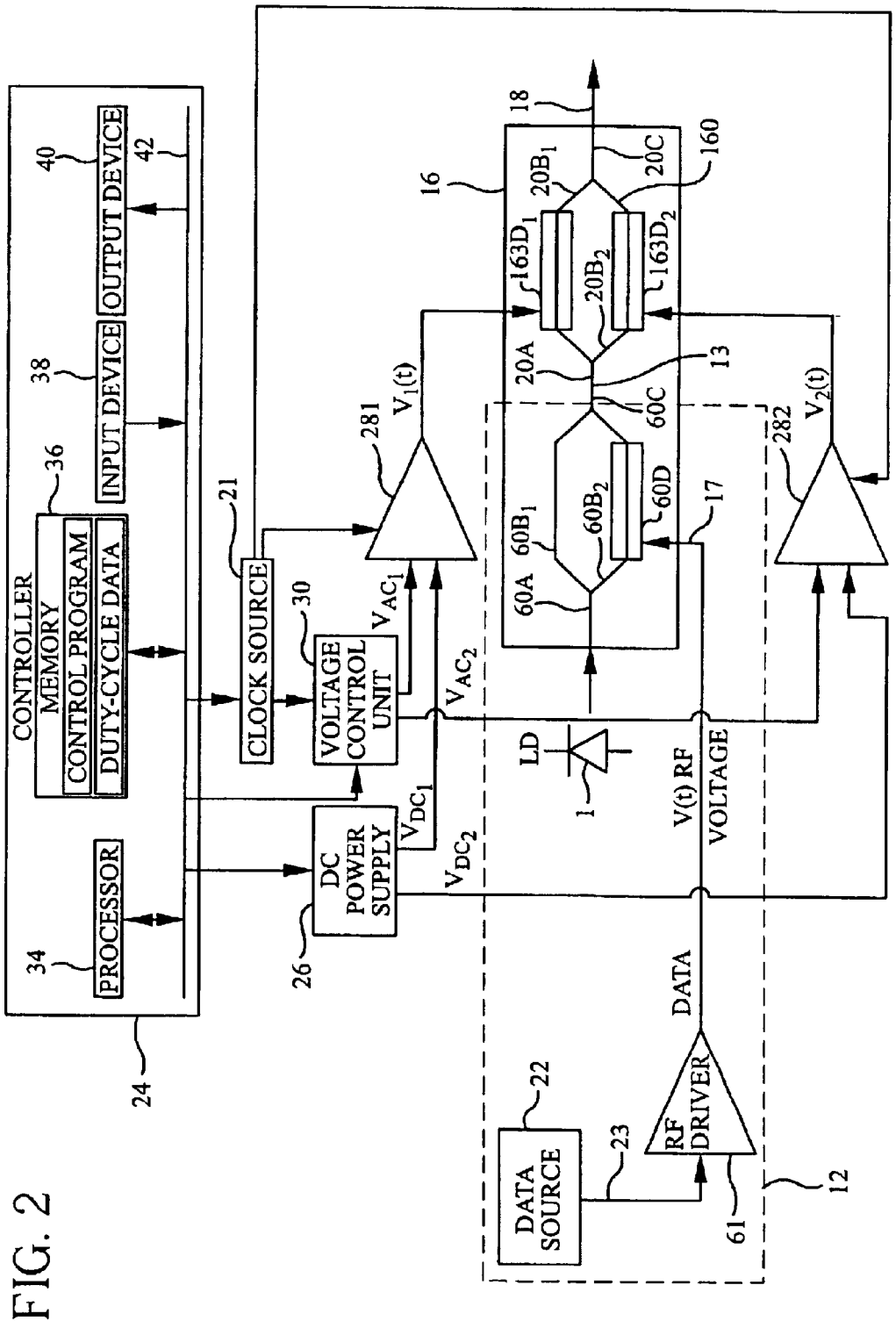
FIG. 2 is a schematic diagram of an example of the input source 12 of FIG. 1 to provide a basic apparatus 16 for pulse generation of any formats using a single RZ Mach-Zehnder modulator 160, depending on the data modulator 60, in accordance with the present invention.

Alternatively, another Mach-Zehnder interferometer receiving the CW signal can act as an encoder or an electrical to optical converter for use as a data modulator 60 before or after the inventive pulse width shaper 160 to receive data encoded electrical signal from a data source 22 to provide the optical signal 13, as seen in FIG. 2. The encoder or data modulator 60 has an optical input on an input arm 60A for receiving the continuous optical signal, an electrical input 17 for receiving a data modulated electrical signal and the optical output 13 on an output arm 60C for providing the modulated optical signal based on the encoded electrical signal.

The device 16 preferably in the form of the MZI 160, either directly or indirectly, modulates the optical signal 13 which is then transmitted along lengths of an output optical fiber 19 spanning the distance to a receiver 21. Typically, an optical amplifier 29, such as an Erbium Doped Fiber amplifier (EDFA) may be provided to amplify the modulated light as it propagates along the lengths of the optical fiber 19.

Preferably, at least one hybrid fiber span 19 has a first length of positive dispersion fiber, a second length of positive dispersion fiber, and a third length of negative dispersion fiber wherein the third length of negative dispersion fiber is optically coupled between the first and second lengths of positive dispersion fibers for use in a telecommunications system 10 that transmits the tuned duty cycle pulses.

In general, modulation implies impressing a prescribed time-dependent waveform (current or voltage) upon a continuous wave (CW) signal. In the context of optical telecommunication systems 10, the CW signal or optical stream or beam is an electromagnetic wave of a single wavelength in the optical region of the spectrum (around 800–1650 nm) and the impressed voltage is in the radio frequency (RF) range and is of the order of a few to tens of gigahertz (GHz). The information sent along the optical telecommunication system 10 is embedded in this RF spectrum or electromagnetic field, and all types of modulators 16 typically add information in the form of RF pulses to the CW optical beam. Most commercially available modulators rely on the electro-optic effect, such as available in the Mach-Zehnder interferometer 160 used as an electro-optic field modulator.

The electro-optic effect is the change in refractive index resulting from the application of a direct current (DC) or low-frequency electric field. A field applied to an anisotropic electro-optic material modifies its refractive indices, thereby altering the propagation characteristics of the optical signal 13. In materials used for Mach-Zehnder interferometers 160, such as lithium niobate ($LiNbO_3$), the refractive index changes approximately linearly in proportion to the applied electric field, in which case the effect is known as the linear electro-optic effect or the Pockels effect. The linear dependence of the refractive index on the electric field may be written, $$n(E) \cong n_0 - \frac{1}{2}\rho n_0^3 E, \tag{1}$$

where $\rho$ is called the Pockels coefficient and has typical values in the range of $10^{-12}$ to $10^{-10}$ m/V, and $n_0$ is the refractive index at zero field.

When a beam of light travels through an electro-optic material (Pockels cell) of length L to which an electric field E is applied, it undergoes a phase shift $\phi=2\pi n(E)L/\lambda_0$, where $\lambda_0$ is the wavelength of light in vacuum. Using Eq. (1), the phase shift is $$\varphi = \varphi_0 - \pi\frac{V}{V_\pi}, \tag{2}$$

where V is the voltage applied across two faces of the cell separated by distance d to induce an electric field E=V/d. Vpi or $V_\pi$, the half-wave voltage, is defined as the applied voltage at which the phase shift changes by $\pi$, and is given by $V_\pi = d\lambda_0/L\rho n_0^3$. According to Eq. (2), the phase of an optical field is modulated by varying the voltage V that is applied across a material through which the light passes. The key parameter that characterizes the modulator is the half-wave voltage, $V_\pi$, which depends on material properties such as $n_0$ and $\rho$, the geometrical aspects of the device in terms of its aspect ratio, d/L, and the wavelength $\lambda_0$.

A schematic of a typical Mach-Zehnder interferometer 160 is shown in FIG. 1. The interferometer splits an input signal 13 from the input source $E_0(t)$ 12 into two paths of nominally equal length L. Since the waveguides are composed of $LiNbO_3$ crystals or another electro-optic material, an applied electric field may be used to change the refractive indices of the two arms relative to each other. With an ideal branching ratio, the optical power is equally split between the two arms, and the recombined field E(t) at the output of the interferometer 160 is the superposition of these two fields:

$$E(t) = E_0(t)\cos\left[\frac{\pi}{2}(sV_0(t) + \xi/2)\right]\exp\left[-i\frac{\pi}{2}(s\alpha'V_0(t) - \xi/2)\right] \tag{3}$$

where $E_0(t)$ is the input optical signal 13, $V_0(t)$, in general, is the electrical driving voltage, and $\alpha'$, $\xi$, and s are the chirp, bias, and swing parameters of the Mach-Zehnder modulator 160, respectively. The parameters $\alpha'$ and s may be related to the fractions of the driving voltage on the two arms of the Mach-Zehnder modulator $f_1$ and $f_2$, by $$s=f_2-f_1 \tag{4}$$

and $$\alpha' = \frac{f_1+f_2}{f_1-f_2}. \tag{5}$$

If different voltages are applied to the two arms of the interferometer, the two signal paths experience different changes in refractive index, thereby causing the fields to travel at slightly different speeds. Consequently, there may be a phase shift between the two fields when they are recombined at the output of the Mach-Zehnder modulator, leading to destructive interference and a subsequent decrease in the intensity or power of E(t) relative to E₀(t).

With non return-to-zero (NRZ) modulation, as one form of a possible modulation format, each "one" pulse occupies an entire bit slot, and the signal intensity does not drop to "zero" between successive "one" bits. The only times when signal intensity changes between "one" and "zero" is when the bit sequence itself changes between "one" and "zero". Since rising or falling between these two intensity levels takes some finite amount of time governed by the electronics that generate the RF signal, it is desirable to describe the shape of the NRZ intensity modulation by a function that is the same in any bit slot. Since the intensities of "one" bits do not return to zero at the edges of the bit slots, adjacent NRZ pulses may be expressed as the sum of functions S(t):

$$V_{0,n}(t) = \sum_{j=n-1}^{n+1} a_j S(t) \tag{6}$$

where $V_{0,n}(t)$ is the driving function for the $n^{th}$ pulse in a bit stream, $a_j$ is the bit value (zero or one), and S(t) is a shape function, typically super-Gaussian or raised cosine.

As is already known, Return-to-zero (RZ) modulation is accomplished by sending an NRZ-modulated signal into a Mach-Zehnder modulator (MZM) with a sinusoidal driving function, $$V_0(t) = A_0 \cos(2\pi v_c t - \pi\theta), \tag{7}$$

where $A_0$ is the amplitude (as a fraction of Vpi), $v_c$ is the frequency of the RZ drive, and $\theta$ is the phase offset as a fraction of $\pi$. Since the NRZ signal going into the RZ modulator has already been encoded with the appropriate sequence of "ones" and "zeros", the RZ modulator does not need a separate electrical input for the desired bit stream, as for another modulation format, such as Alternate Mark Inversion (AMI). RZ modulation currently takes two popular forms: standard RZ with fixed duty cycles of 50% or 33.3%, and carrier-suppressed (CSRZ) with a fixed duty cycle of 66.7%.

Equation (3) assumes an ideal branching ratio, but the analysis may easily be extended to a non-ideal branching ratio, in which case the electric fields in the two arms of the interferometer are $$E_1(t) = \alpha E_0(t) \text{ and } E_2(t) = (1-\alpha) E_0(t) \tag{8}$$

Whereas dual-drive Mach-Zehnder modulators, with $f_1$ and $f_2$, may be used to produce chirp-free RZ pulses, the less expensive single-drive Mach-Zehnder modulators, with $f_1$ or $f_2 = 0$, generally produce RZ pulses with chirp. This chirp is usually an undesirable feature in optical signal transmission because it may lead to dispersion penalty as well as linear cross-talk penalty.

When traditional single drive Mach-Zehnder modulators are used, the chirp parameter $\alpha'$ is necessarily non-zero, therefore the pulses are chirped. Such chirped pulses may experience additional dispersion penalty due to propagation or may have additional spectral content resulting in linear cross-talk penalty. The resultant optical pulses are distorted such that the signal is significantly degraded due to the appearance of side lobes on the edges of the pulses.

Definitions $$\text{Extinction ratio} = X = \frac{I_{max}}{I_{min}},$$

where $I_{max}$ is the maximum intensity of output field (corresponding to a "one" bit) and $I_{min}$ is the minimum intensity (corresponding to a "zero" bit). With an ideal Mach-Zehnder modulator, the intensity of a "zero" bit is $I_{min}=0$, so X is infinite. A finite extinction ratio means that the output intensity of a "zero" bit is some finite value $I_{min}>0$.

Alternate Phase Modulation. In alternate phase modulation, every "one" bit has a phase shift of $\pi$ with respect to its two neighboring "one" bits.

Differential phase shift keying (DPSK) works by encoding an auxiliary input bit sequence into the carrier phase.

Alternate mark inversion (AMI) involves generating a three-level electrical waveform using an input bit sequence and a counter sequence. This electrical waveform is then used as the driving function in a Mach-Zehnder modulator to generate a two-level optical signal with alternating phase "one" bits.

Duobinary modulation is similar to AMI in that a three-level electrical waveform is generated from a given input bit sequence, and this waveform is then used as the driving function for a Mach-Zehnder modulator. As with AMI, input "one" bits are encoded as either positive or negative "ones" in the electrical driving function, and the change in sign between these two states reflects itself as a $\pi$ phase shift between "one" bits in the output optical signal; "zero" input bits are always given as "zero" in the electrical driving function. The difference between duobinary and AMI is that whereas "one" bits in AMI are always $\pi$ phase-shifted from their two neighboring "one" bits at either side, the phase shift resulting from duobinary encoding only occurs when "one" bits are separated by "zeroes."

Output intensity=Output power=Transmittance*Input Power.

Half-wave point=Vpi or any odd multiple of Vpi=one of two zero power transmittance points on the transfer function.

Transmittance versus drive voltage characteristic curve= MZ transfer function.

Inflection point=half-way between two zero power transmittance derivative points on the MZ transfer function.

Bit slot ∝ bit period(T) where the bit period (T) equals 1/Bit Rate (B). The bit period (T) refers to a specific time interval such as 100 picoseconds for a bit rate (B) of 10 Gb/s (1/T) system. Bit slot refers to the abstract notion of a bit occupying some time slot. In a time division multiplexing (TDM) system, amplitude shift keying modulation techniques of the return to zero (RZ) format is usually used for time multiplexing N synchronous RZ data streams, each having a bit period of T or 1/B, before multiplexing or the parallel-to-serial conversion, and pulsing at a bit rate of 1/T or B into a serial data sequence of short pulses operating at a multiplexed bit rate or baud rate of N/T or NB for multiplexing into the optical communication link within a frame.

Requirements for RZ Pulses

Without loss of generality, the coefficient $A_0$ in Eq. (7) may be set equal to unity, since the swing parameter, s, can always be rescaled to absorb the value of $A_0$. Using Eq. (3), the amplitude of the optical field at the output of an ideal RZ Mach-Zehnder modulator is $$E(t) = E_0 \cos\left[\frac{\pi\xi}{4} + \frac{\pi s}{2}\cos(2\pi v_c t - \pi\theta)\right], \quad (9)$$

where the input is assumed to be a CW field of amplitude $E_0$. For perfect non-distorted RZ pulses, the output field should satisfy the following requirements:

1. $E(t)$ should be periodic with period equal to $1/B$, where B is the bit rate.
2. $E(t)$ should be zero at the bit-period boundaries, $t=0$ and $t=1/B$.
3. $E(t)$ should reach its maximum value at the center of the bit-period, $t=1/(2B)$.
4. $E(t)$ should not have any other local maxima or minima, i.e., $dE(t)/dt \neq 0$, except at the minima, $t=0$, $1/B$, and at the maximum, $t=\frac{1}{2}B$.

The first requirement above is just a restatement of a periodic sequence of a pulse train with a period $1/B$ or T, at a bit rate of B. The second requirement implies that there is an infinite extinction ratio. The third and fourth requirements together imply the formation of symmetric RZ-shaped pulses having a single maximum at the center of the bit slot. An additional constraint is that the field in Eq. (9) from the MZI 160 should have the parameters to provide an appropriate duty cycle for a particular system which has already been tested or simulated for the best range of optimized duty cycles.

EXAMPLE 1

50% Duty Cycle RZ Pulses

For this known situation of 50% duty cycle RZ pulses, the nominal parameters of the Mach-Zehnder modulator (MZM) are given by $\xi=1$, $s=\frac{1}{2}$, $v_c=B$, $\theta=0$. With $E_0=1$, the output electric field is $$E(t) = \frac{1}{\sqrt{2}}\left[\cos\left(\frac{\pi}{4}\cos(2\pi Bt)\right) - \sin\left(\frac{\pi}{4}\cos(2\pi Bt)\right)\right] \quad (10)$$

The first three RZ pulse requirements are automatically satisfied:

$E(t+1/B)=E(t)$, $E(0)=E(1/B)=0$, and $E(1/(2B))=1$.

To evaluate the fourth requirement, note that the derivative of Eq. (10) vanishes only at the bit center and the bit boundaries where the field is maximum (equal to one) and zero, respectively. These properties correspond to periodic, RZ shaped "single" pulses at each bit slot. The duty cycle ($d_c$) is determined by the full-width at half maximum (FWHM of the intensity) fraction of the entire bit period ($d_c$=FWHM/B). When the intensity is half of its maximum value, the field amplitude reaches $1/\sqrt{2}$ of its maximum value, which occurs at times $t=\pm 1/(4B)$ and corresponds to a duty cycle of $$d_c = \frac{\frac{1}{4B} - \left(-\frac{1}{4B}\right)}{\frac{1}{B}} = 50\%. \quad (11)$$

EXAMPLE 2

33% Duty Cycle RZ Pulses

For this known situation, the parameters of the MZM are given by $\xi=0$, $s=\pm 1$, $v_c=B/2$, $\theta=0$. With $E_0=1$, the output electric field is $$E(t) = \cos\left(\frac{\pi}{2}\cos(\pi Bt)\right) \quad (12)$$

The first three RZ pulse requirements are automatically satisfied:

$E(t+1/B)=E(t)$, $E(0)=E(1/B)=0$, and $E(1/(2B))=1$.

To evaluate the fourth requirement, note that the derivative of Eq. (12) vanishes only at the bit center and the bit boundaries where the field is maximum (equal to one) and zero, respectively. These properties again correspond to periodic, RZ shaped "single" pulses at each bit slot. The duty cycle is determined by the full-width at half maximum (of the intensity) fraction of the entire bit period. When the intensity is half of its maximum value, the field amplitude reaches $1/\sqrt{2}$ of its maximum value, which occurs at times $t=1/(3B)$ and $t=2/(3B)$, which corresponds to a duty cycle of $$d_c = \frac{\frac{2}{3B} - \left(\frac{1}{3B}\right)}{\frac{1}{B}} = 33.3\%. \quad (13)$$

Requirements for CSRZ Pulses

For CSRZ pulses, the output field has the following requirements:

1. $E(t)$ should be periodic with a half-period equal to $1/B$, where B is the bit rate.
2. $E(t)$ should be zero at the bit-period boundaries, $t=0$ and $t=1/B$.
3. $E(t)$ should reach its absolute maximum value at the center of the bit-period, $t=1/(2B)$.
4. $|E(t)|^2$ should not have any other local maxima or minima, i.e., $d|E(t)|^2/dt \neq 0$, except at the minima, $t=0$, $1/B$, and at the maximum, $t=1/(2B)$.
5. $E(t)$ should reverse signs every bit period so that the average value of $E(t)=0$.

Requirements 2–4 are identical to those that must be obeyed by RZ pulses. The first requirement states that the period for CSRZ pulses is $\frac{1}{2}B$ rather than the $1/B$ for RZ pulses. The fifth requirement is designed to ensure that there is no contribution from $E(t)$ at the carrier frequency. The same assumption holds true for CSRZ or any other modulation format in that the field in Eq. (9) has the appropriate duty cycle for a particular system that is pre-tested.

EXAMPLE 3

67% Duty Cycle CSRZ Pulses

For this known situation, the parameters of the MZM are given by $\xi=2$, $s=-1$, $v_c=B/2$, $\theta=\frac{1}{2}$. With $E_0=1$, the output electric field is $$E(t) = \sin\left(\frac{\pi}{2}\sin(\pi Bt)\right) \quad (14)$$

The first three and the fifth CSRZ pulse requirements are automatically satisfied:

1. $E(t+2/B)=E(t)$
2. $E(0)=E(1/B)=0$
3. $E(1/(2B))=1$
5. $E(t+1/B)=-E(t)$,

The derivative of the square modulus of Eq. (14), $d|E(t)|^2/dt$, vanishes only at the bit center ($t=1/(2B)$) and the bit boundaries (t=0 and t=1/B) where the intensity is maximum (equal to one) and zero, respectively, which satisfies the fourth CSRZ pulse requirement. These five properties correspond to periodic, RZ shaped "single" pulses with carrier suppression. The duty cycle is determined by the full-width at half maximum (of the intensity) fraction of the entire bit period. When the intensity is half of its maximum value, the field amplitude reaches $1/\sqrt{2}$ of its maximum value, which occurs at times t=1/(6B) and t=5/(6B), which corresponds to a duty cycle of $$d_c = \frac{\frac{5}{6B} - \left(\frac{1}{6B}\right)}{\frac{1}{B}} = 66.7\%. \tag{15}$$

EXAMPLE 4

Variable Duty Cycle RZ Pulses

In accordance with the teachings of the present invention, to produce RZ pulses with duty cycles other than those known standards in Examples 1 and 2, the nominal parameters of the standard RZ or CSRZ modulator must be varied. A schematic of the variable duty cycle device 16 is shown in FIG. 2. In this embodiment, the present invention is applied to an optical transmitter capable of transmitting a high-speed optical signal in an RZ data format, by connecting two Mach-Zehnder type optical modulators in a serial two staged manner.

Referring to FIG. 2, the pulse-width shaper 160 of FIG. 1 is represented as a second modulator 20, after a first data modulator 60 in a two-stage concatenation schematic of a transmitter usable in the system 10 of FIG. 1. However, the sequence of the modulators can be reversed with the data modulator 60 placed after the pulse-width shaper 20. The optical transmitter includes a light source (LD) 1 as part of the input source 12 for generating the continuous wave (CW) signal. A Mach-Zehnder type optical modulator 60 externally modulates light from the light source 1 in a two-staged manner. A duty cycle controlling circuit or controller 24 controls the duty cycle to be forced upon the optical signal modulated by a Mach-Zehnder type optical modulator 160.

The two-staged Mach-Zehnder type optical modulator is different from that of the Mach-Zehnder type optical modulator used by itself, in that: instead of having a substrate for implementing the device 16 for conducting the modulation in a single stage manner, the substrate for implementing the device 16 conducts modulation in a two staged manner by serially connecting a similar Mach-Zehnder type optical modulator to the preceding stage of the modulator on a single substrate, such as lithium niobate. An RF driver 61 at the preceding stage side of the substrate 60 provides a drive signal V(t). The latter stage side of the substrate part 60 provides the first and second drive signals $V_1(t)$, $V_2(t)$.

At the preceding stage side of the substrate for the device 16, the CW light from the light source 1 is coupled into a light input end 60A, and thereafter bifurcated to be propagated through first arm 60 B1 and second arm 60 B2, respectively, and then combined into a resultant light to be output from a light output end 60C to the light input end 20A of the latter stage side. Formed on the first arm 60 B1 is an electrode 60D to which an RF drive signal V(t) is applied from the light input end 60A side. In such a substrate of the device 16 of a two-staged modulator, the CW light from the light source 1 is intensity modulated at the preceding stage side in accordance with the data signal in a desired modulation format, such as normally an NRZ format but optionally can be of an AMI format, and then intensity modulated at the latter stage side in accordance with a clock signal corresponding to the modulation at the preceding stage side, to finally generate an optical signal in an RZ data format. Similarly to using a single MZ modulator, the duty cycle to be forced upon the optical signal is controlled by adjusting the bias and swing amplitude ratios between the first and second drive signals $V_1(t)$, $V_2(t)$ to be applied to the latter stage side.

A data source 22 is provided on an electrical input 23 for coupling a data encoded electrical signal. The RF driver 61 generates a signal as an origin of the drive signal V(t) such as by amplifying the data signal (DATA) at a required bit rate and in an NRZ format to a predetermined level, and outputs the signal to the electrode 60D.

A controller 24, a DC power supply 26, a clock source 21, a voltage control unit (VCU) 30 forms a duty cycle controlling circuit to control biasing drivers 281 and 282. The controller 24 includes a processor 34, a memory 36, an input device 38, and an output device 40 coupled via bus 42. The memory 36 is loaded with a control program that the processor 34 executes to permit the controller 24 to be programmed by a person in preparation for operation of the device 16. It would be appreciated that instead of having a control program to operate the device 16, a person can first predetermine the duty cycle needed, use the equations taught by the present invention and operate the device 16 directly or manually by setting the desired driving signals $V_1(t)$ and $V_2(t)$.

However, by automatic program control, the processor 34 executes the control program to control the desired driving signals $V_1(t)$ and $V_2(t)$, without or without feedback, as desired. The control program can be preloaded in the device 16 prior to use, or may be input by a person at the time the controller 24 is programmed for operation. A person can also use the input device 38 to provide the controller.24 with a mapping of data indicating duty cycle of an optical signal to be generated by the apparatus 16, and corresponding data indicating respective magnitudes of voltages $V_{DC}$ and $V_{AC}$ that the controller 24 is to use to generate the optical signal with the duty cycle indicated by the user. A person can use the input device 38 to enter a command to the processor 34 to execute its control program. A person can also use the input device 38 to input data indicating the duty cycle of the optical signal that is to be generated by the apparatus 16. In executing the control program, the processor 34 uses the duty cycle data input by the user to retrieve data from the memory 34 that indicates the magnitudes of corresponding voltages $V_{DC}$ and $V_{AC}$ to be used by the apparatus 16 for generating the optical signal with the designated duty cycle. The processor 34 is coupled via bus 42 to supply the signal indicating the magnitude of the voltage $V_{DC}$ to the DC power supply 26, and the DC power supply 26 generates the voltage $V_{DC}$ based on the signal from the controller 24. The controller 24 is also coupled to supply the signal indicating the magnitude of the voltage $V_{AC}$ to the VCU 30. The VCU 30 is also coupled to receive a clock signal generated by a clock source 28, optionally under control of the processor 34. The VCU 30 generates the voltage $V_{AC}$ based on the signals from the controller 24 and the clock source 28. More specifically, the VCU 30 generates the voltage $V_{AC}$ with the magnitude determined by the control signal from the controller 24, and a frequency determined by the frequency of the clock signal. The DC power supply 26 and the VCU 30 are coupled to supply respective voltages $V_{DC}$ and $V_{AC}$ to the drivers 281 and 282. Based on the voltages $V_{DC}$, $V_{AC}$, and the CW signal, the device 16 generates a variable duty-cycle optical signal.

The ability to control the duty-cycle of an optical pulse signal is becoming increasingly important in transmission of optical signals, particularly over relatively long distances on the order of one-hundred kilometers or more. As the duty cycle is decreased, pulse distortion due to self-phase modulation and cross-phase modulation of optical fibers is reduced as previously described. However, as the duty cycle is decreased, the spectral width of the pulse is increased, leading to increased pulse spreading due to dispersion. The duty cycle can be adjusted according to the nonlinear and dispersion characteristics of the fiber at the particular transmission wavelength to improve the ability to detect the pulses at the receiver 21 of FIG. 1 after transmission. Testing and modeling of an optical network system can be performed to determine the duty-cycle yielding improved or optimal results, and such duty cycle can be programmed into the controller 24.

Manually or by program execution, the optimum duty cycle for best system performance has to be determined first in order to derive the magnitudes of voltages $V_{DC}$ and $V_{AC}$ that yield such a duty cycle for application to the device 16. This can be done by determining magnitudes of voltages $V_{DC}$ and $V_{AC}$ at intervals of the duty cycle, e.g., in 1% increments, for duty cycles from 0–100%. The resulting duty cycle data can be used by the processor 34 to generate signals indicating the magnitudes of the voltages $V_{DC}$ and $V_{AC}$ upon the user's specification of the duty cycle via the input device 38. The optimum duty cycle has to provide a timing, at which the first and second drive signals $V_1(t)$, $V_2(t)$ becoming the maximum or the minimum, coincides with a transitional point of the data or with a substantial center of a bit slot or the 1 unit data length of the RF drive signal $V(t)$.

Functionally, in the optical transmitter, the CW light generated by the light source 1 is NRZ-data modulated at the preceding stage side of the Mach-Zehnder type optical modulator of the device 16. The NRZ-data modulated optical signal is further modulated in accordance with the clock signal at the latter stage side of the Mach-Zehnder type optical modulator 16, and thus converted into an RZ data format. The electrodes 163, made-up of 163 D1, 163 D2 at the latter stage side are applied with the first and second drive signals $V_1(t)$, $V_2(t)$ controlled so that these first and second drive signals $V_1(t)$, $V_2(t)$ are brought into an antiphase relation with the bias and swing amplitude ratios corresponding to the optimum duty cycle amount for best system performance.

In this way, the latter side of the substrate 60 conducts modulation by simultaneously driving two arms or only one arm to transmit a high-speed optical signal such as in an RZ data format.

Preferably, the bias and swing parameters of the Mach-Zehnder modulator 160 are allowed to vary dependently while the other parameters are held constant to the values given in Example 1 for a 50% duty cycle. The general form of the output electric field is then $$E(t) = E_0(t) \cos\left[\frac{\pi s}{2}\cos(2\pi Bt) + \frac{\pi \xi}{4}\right]\exp\left[-i\frac{\pi}{2}\left(sa' \cos(2\pi Bt) - \frac{\xi}{2}\right)\right] \quad (16)$$

As previously noted, the requirements for RZ pulses include that $E(t)$ be periodic with a period of $1/B$, that it vanish at the bit boundaries, and that it have a global maximum at the bit-center.

The present invention teaches that if the bias coefficient, $\xi$, and the swing, s, are varied such that $s=1-\xi/2$, then the output RZ pulses will have variable duty cycles that can be selected for values other than 33% and 50%.

Hence, a method of generating variable duty cycle optical pulses of a first modulation format is generally taught where a continuous wave optical beam is coupled into a first electro-optic field modulator. A radio frequency (RF) voltage is applied to the first electro-optic field modulator to produce an optical output signal of a second modulation format. The optical output signal is directed into a second electro-optic field modulator having a chirp parameter a and a power transfer function. A DC bias voltage coefficient $\xi$ is applied to the second electro-optic field modulator. An AC swing voltage amplitude s is applied to the second electro-optic field modulator.

The swing voltage s, normalized to Vpi (divided by Vpi), has to be equal to $Vpi-V_b$ and must be symmetric about the bias voltage $V_b$. Substituting the $V_b$ of Eq. (16-c) into the relationship $Vpi-V_b$ and dividing out Vpi, yields the following relationship between the bias voltage coefficient and swing voltage amplitudes:

$$s=1-\xi/2; \quad (16\text{-}a)$$

and $\xi$ is selected to be greater than 1 and less than or equal to 1.9 such that the maximum power transmittance point on the transfer function is less than 100%.

Generally, Mach-Zehnder modulators 160 are driven by a driving function where $$V_0(t)=V(t)/Vpi \quad (16\text{-}b)$$

The bias voltage $V_b$ is purposely set to be different than a normally biased operating point at Vpi/2 by the bias coefficient $\xi$ to satisfy the following equation:

$$V_b=\xi Vpi/2 \quad (16\text{-}c)$$

In order to obtain variable duty cycle pulses, the modulator 160 is driven in one or both arms using $$V_1(t)=f_1 V(t)=f_1 Vpi \cos(2\pi Bt) \text{ for a particular } V(t) \text{ for RZ pulses} \quad (16\text{-}d1)$$

and $$V_2(t)=f_2 V(t)=(f_1+1-V_b/Vpi)Vpi \cos(2\pi Bt)+V_b, \quad (16\text{-}d2)$$

where t is time measured from the beginning of a bit slot, $V_1(t)$ is the voltage applied to one arm of the Mach-Zehnder modulator 160, $V_2(t)$ is the voltage applied to the other arm, Vpi is the half-wave voltage of the modulator, $V_b$ is the bias voltage, and B is the bit rate of the optical signal. Equation (16-d2) can be derived from substituting the bias coefficient $\xi$ of equation (16-c) into equation (16-a) to arrive at the substitution for $f_2$.

In the case of a single-drive modulator, $f_1=0$ and the output pulses are necessarily chirped. With dual-drive modulators, $f_1$ is a free parameter and the pulses may be set to chirp-free ($f_1=-f_2$). When the $f_2$ value of equation (16-d2) is substituted in the chirp-free equation, $f_1$ is solved to be:

$$f_1=\tfrac{1}{2}(V_b/Vpi-1) \quad (16\text{-}d3)$$

In order to force the maximum power transmittance point on the MZ transfer curve to be less than 100%, in accordance with the present invention, the bias voltage is set to values between but not including ½ Vpi and Vpi. The duty cycle ($d_c$) of the output pulses, defined as the full width at half maximum (FWHM) of the pulse intensity, is approximately $$d_c(V_b)=0.6788\ V_b^2/Vpi^2-1.2752\ V_b/Vpi+0.9659 \tag{16-d4}$$

assuming an NRZ input for the optical signal 13 and using a best-fit numerical technique. The bias voltage as a function of a desired duty cycle can then be expressed as $$V_b(d_c)=Vpi[0.93931-1.21376(d_c-0.36699)^{1/2}] \tag{16-d5}$$

The phase modulation index is defined as the peak-to-peak "amplitude" of the sinusoidally varying phase term in Eq. 3. Hence, with an arbitrary $f_1$, the magnitude of the chirp is proportional to the sα' term in the phase modulation index portion of the varying phase, when the $f_1$ and $f_2$ terms are substituted in equations (16-a) and 5 such that $$-s\alpha'=2f_1+(1-V_bVpi)=2f_1+s \tag{16-d6}$$

Thus, the magnitude of the chirp and the duty cycle can be independently controlled. If two pulse width shapers 160 are concatenated in series with the chirp parameter α in Equation (16-d6) selected for opposite chirp, then the pair of pulse width shapers 160 can be used together to substitute as one pulse width shaper for other combinations with various data modulators and an optional phase modulator.

The use of these parameters to vary the duty cycle is illustrated by choosing two examples with different duty cycles: RZ 50% and RZ 41%.

To obtain RZ 50%, the duty cycle is equal to $d_c=0.5$. From Eq. (16-d5), the bias voltage is taught to be approximately given by $V_b=½$ Vpi. If system performance requires the pulses to be chirp-free, the parameter $f_1$ can be evaluated from Eq. (16-d3) to be equal to $f_1=-¼$. Using equations 16-d1 and 16-d2, the voltages in the two arms of the Mach-Zehnder modulator 160 are given by $$V_1(t)=-Vpi/4\ \cos(2\pi Bt) \tag{16-d7}$$

and $$V_2(t)=Vpi/4\ \cos(2\pi Bt)+Vpi/2 \tag{16-d8}$$

In the case of RZ 41%, the duty cycle is equal to $d_c=0.41$. The bias voltage is then approximately $V_b=0.6876$ Vpi from Equation 16-d5. Similarly, if system performance requires the pulses to be chirp-free, the parameter $f_1$ is given by $f_1=-0.1562$. Thus the voltage in the two arms of the Mach-Zehnder modulator are given by Equations (16-d1) and (16-d2):

$$V_1(t)=-0.1562\ Vpi\ \cos(2piBt) \tag{16-d9}$$

and $$V_2(t)=0.1562\ Vpi\ \cos(2piBt)+0.6876\ Vpi \tag{16-d10}$$

The particular known case of 50% duty cycle is obtained when the bias voltage $V_b=Vpi/2$ for which the bias coefficient ξ is 1 and swing is ½ referenced (or normalized) to Vpi, in accordance with Example 1. The new case of 41% duty cycle is obtained when the bias voltage $V_b=0.6876$ Vpi for which the bias coefficient ξ is 1.4 from Equation (16-c) and swing is 0.3 referenced (or normalized) to Vpi, from using Equation 4. In accordance with the teachings of the present invention, the bias coefficient ξ of the RZ modulator may be adjusted between its nominal value of 1 and a maximum useful value of 1.9. For larger values of the bias parameter or coefficient ξ, there is very little signal transmission and a very high level of amplification is required to restore the signal.

Hence, in general, for the MZ modulator 160 of FIG. 1 wherein either the incoming optical beam 13 is modulated using a nonreturn-to-zero (NRZ) data stream, as in FIG. 2 or the output optical signal 18 is modulated with an NRZ data stream, as could be by the modulator 160 itself or by an additional later staged modulator in FIG. 1, the output of the combined setup of the staged device 16 will be a pulse train of optical pulses having an intensity with an RZ shape with a prescribed pulse width that depends on the amount of destructive optical interference between the first and second arms as tuned by the DC and AC voltages. This pulse width corresponds to a duty cycle that ranges between about 37% and 50%. (RZ-1)

Figure 3:
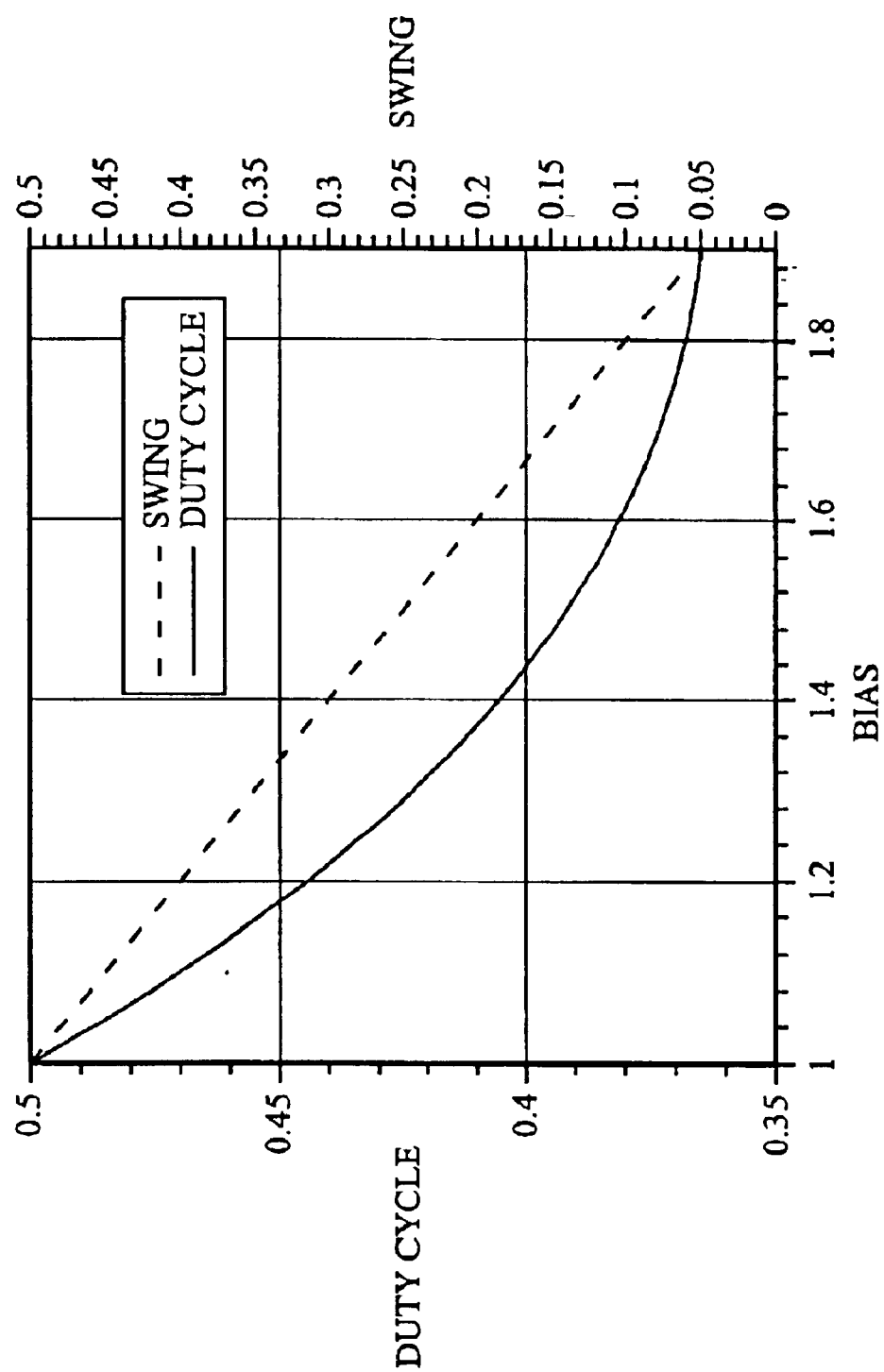
FIG. 3 is a graph of variable RZ duty cycle and swing as a function of the bias coefficient of the apparatus 16 of FIG. 2, formatted as a single RZ Mach-Zehnder modulator, in accordance with the present invention.
Figure 4:
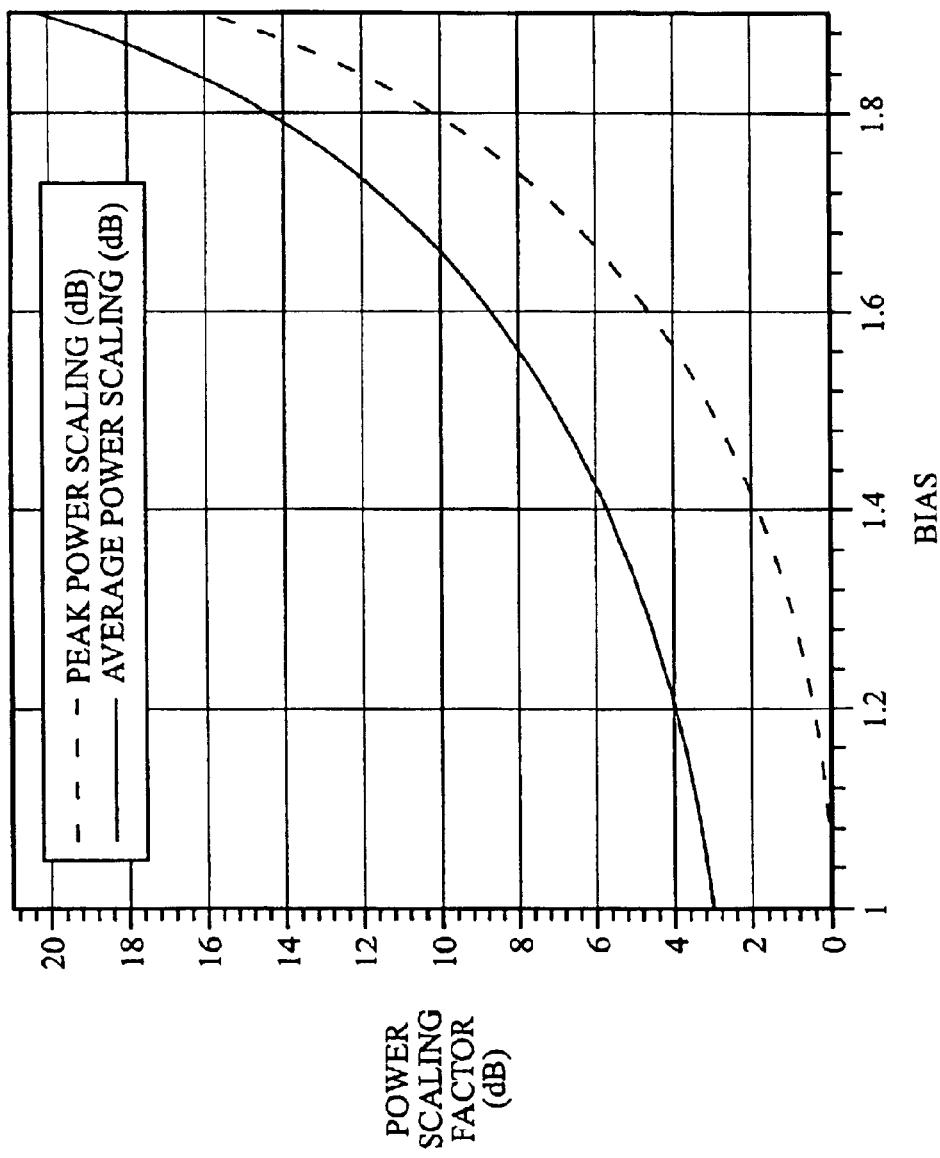
FIG. 4 is a graph of peak and average (total) power scaling factors as a function of bias of the single RZ Mach-Zehnder modulator 16 of FIG. 3 in accordance with the present invention.

Using this relationship between the bias and swing parameters, as taught in accordance with the present invention, it is thus possible to select and generate regular RZ pulses with continuously varying duty cycles between about 50% and 37%, as shown in FIG. 3. The average and peak power scaling factors, which relates to destructive interference, as a function of the RZ bias coefficient ξ are given in FIG. 4. If a dual-drive modulator is used, then α' may be set to zero by selecting the proper $f_1$ and $f_2$ while satisfying the swing relationship between $f_1$ and $f_2$ such that the output pulses are chirp-free. If the modulator is single-drive, then α'=±1 and the RZ pulses are chirped with a phase modulation index of (πs). Since the phase modulation index is defined as the peak-to-peak "amplitude" of the sinusoidally varying phase in Eq. 3, when $V(t)=\cos(2\pi Bt)$ and α'=+/−1 for chirped RZ 50%, a time-dependent phase term exists: $\exp(+/-i\pi/2s\ \cos(2\pi Bt))$ to create a peak-to-peak fluctuation in the phase of π*s.

CSRZ Modulator With Variable Swing

In order to obtain variable duty cycle CSRZ pulses, in accordance with the present invention, the modulator 160 is driven in both arms using $$V_1(t)=-½sVpi\ \sin(\pi Bt) \tag{16-d11}$$

and $$V_2(t)=½sVpi\ \sin(\pi Bt)+V\pi, \tag{16-d12}$$

where t is time measured from the beginning of a bit slot, $V_1(t)$ is the voltage applied to one arm of the Mach-Zehnder modulator, $V_2(t)$ is the voltage applied to the other arm, Vpi is the half-wave voltage of the modulator, $V_b$ is the bias voltage, B is the bit rate of the optical signal, and s is the swing parameter. In order to be truly carrier-suppressed the pulses must be chirp-free, so the modulator chirp parameter must be zero. Accordingly, the swing parameter s (normalized to Vpi) may assume values between but not including −1 and 0. The duty cycle of the output pulses, defined as the full width at half maximum of the pulse intensity, is approximately $$d_c(s)=0.1935\ s^2+0.0316\ s+0.5028 \tag{16-d13}$$

assuming an NRZ input for the optical signal 13. The swing parameter can then be expressed as a function of a desired duty cycle as $$s(d_c)=-0.0816537-2.2733(d_c-0.5015)^{1/2} \tag{16-d14}$$

For illustrating the use of these parameters, in accordance with the present invention, two examples are chosen: CSRZ 67% and CSRZ 55%.

To obtain standard CSRZ 67%, the duty cycle is equal to $d_c=0.67$. The swing parameter is obtained from Eq. (16-d14) to be approximately given by $s=-1$. Thus the voltages in the two arms of the Mach-Zehnder modulator 160 are given by using Eqs. (16-d11 and 16-d12):

$$V_1(t) = \tfrac{1}{2} Vpi \sin(\pi Bt) \qquad (16\text{-}d15)$$

and $$V_2(t) = -\tfrac{1}{2} Vpi \sin(\pi Bt) + Vpi \qquad (16\text{-}d16)$$

In the new case of CSRZ 55%, the duty cycle is equal to $d_c=0.55$. The swing parameter is then approximately $s=-0.5823$ from using Eq. (16-d14). Thus the voltage in the two arms of the Mach-Zehnder modulator 160 are given by $$V_1(t) = 0.2911 Vpi \sin(\pi Bt) \qquad (16\text{-}d17)$$

and $$V_2(t) = -0.2911 Vpi \sin(\pi Bt) + Vpi \qquad (16\text{-}d18)$$

Figure 24:
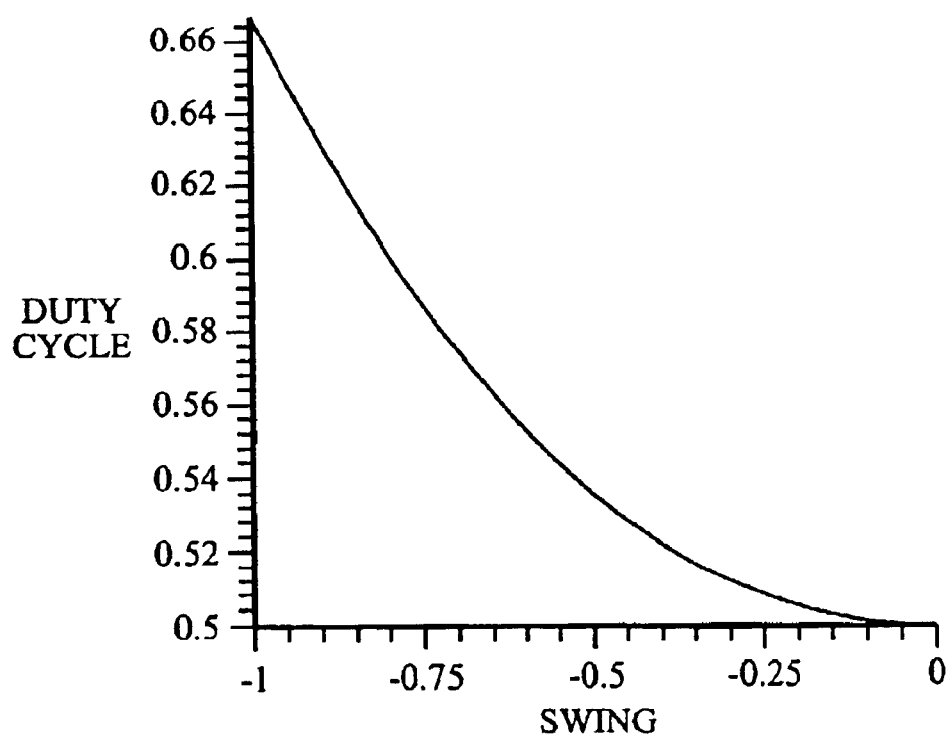
FIG. 24 is a graph of variable CSRZ duty cycle as a function of swing of the device 16 of FIG. 2 with the second MZI 160 formatted for CSRZ where a less-than-full symmetrical AC swing is taken about the DC bias voltage point or nominal inflection point, in accordance with the present invention.

Hence, in general when referring to FIG. 2, either the incoming optical beam 60A is modulated using a nonreturn-to-zero (NRZ) data stream or the output optical signal 20A is modulated with such an NRZ data stream, as one example of a first modulation format for the first modulator 60. The output of the combined setup 20C are optical pulses having a field amplitude with a CSRZ shape with a prescribed pulse width that depends on the amount of destructive optical interference between the first 20B1 and second 20B2 arms as tuned by the peak of the AC voltage such that this pulse width corresponds to a duty cycle that ranges between about 50% and 67% as seen in FIG. 24. (CSRZ-2)

Figure 18:
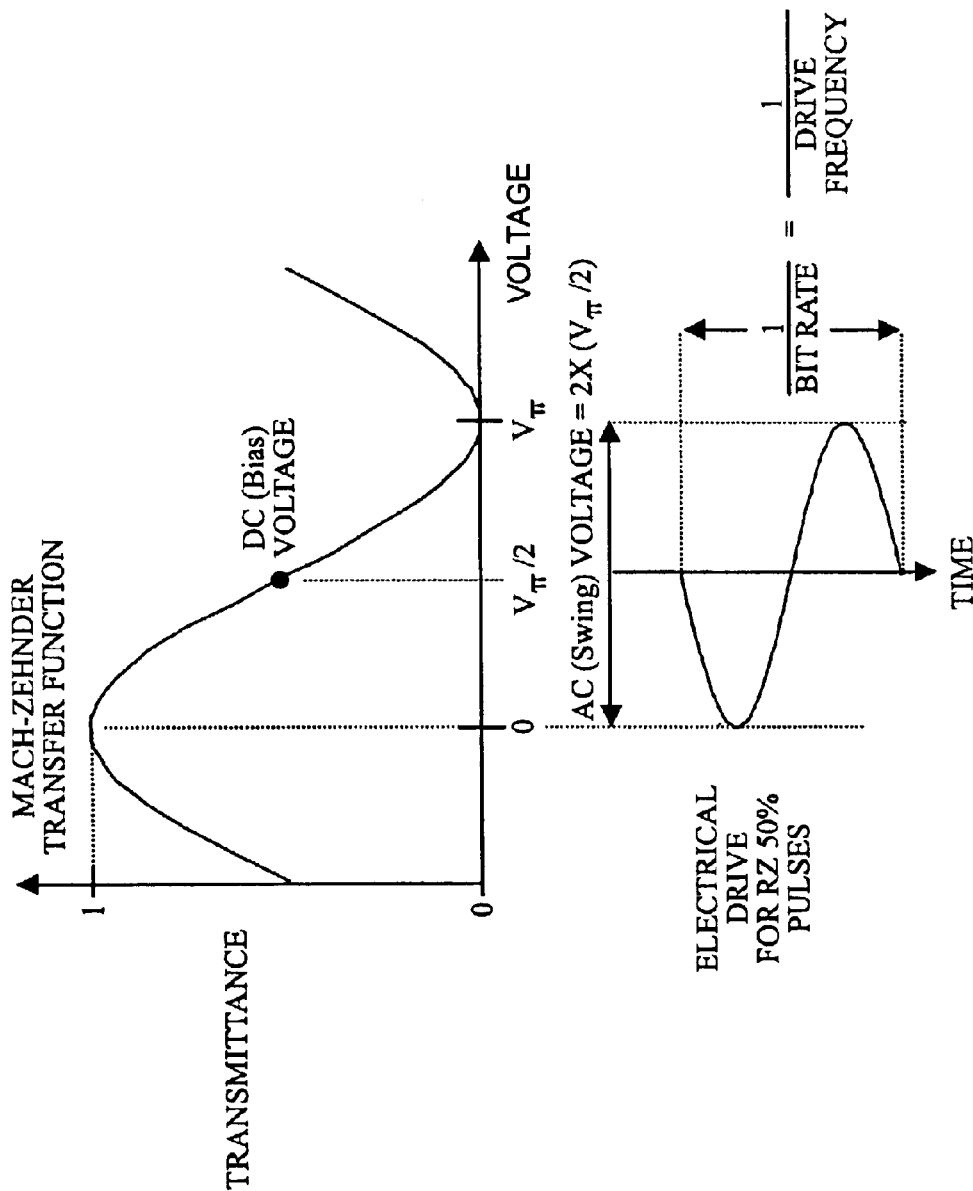
FIG. 18 is a transmittance transfer function and drive for standard RZ 50% pulse generation using the device 16 of FIG. 2 with the second MZI 160 formatted for RZ where the full symmetrical AC swing (from 0 to Vpi) is taken about the inflection point.
Figure 19:
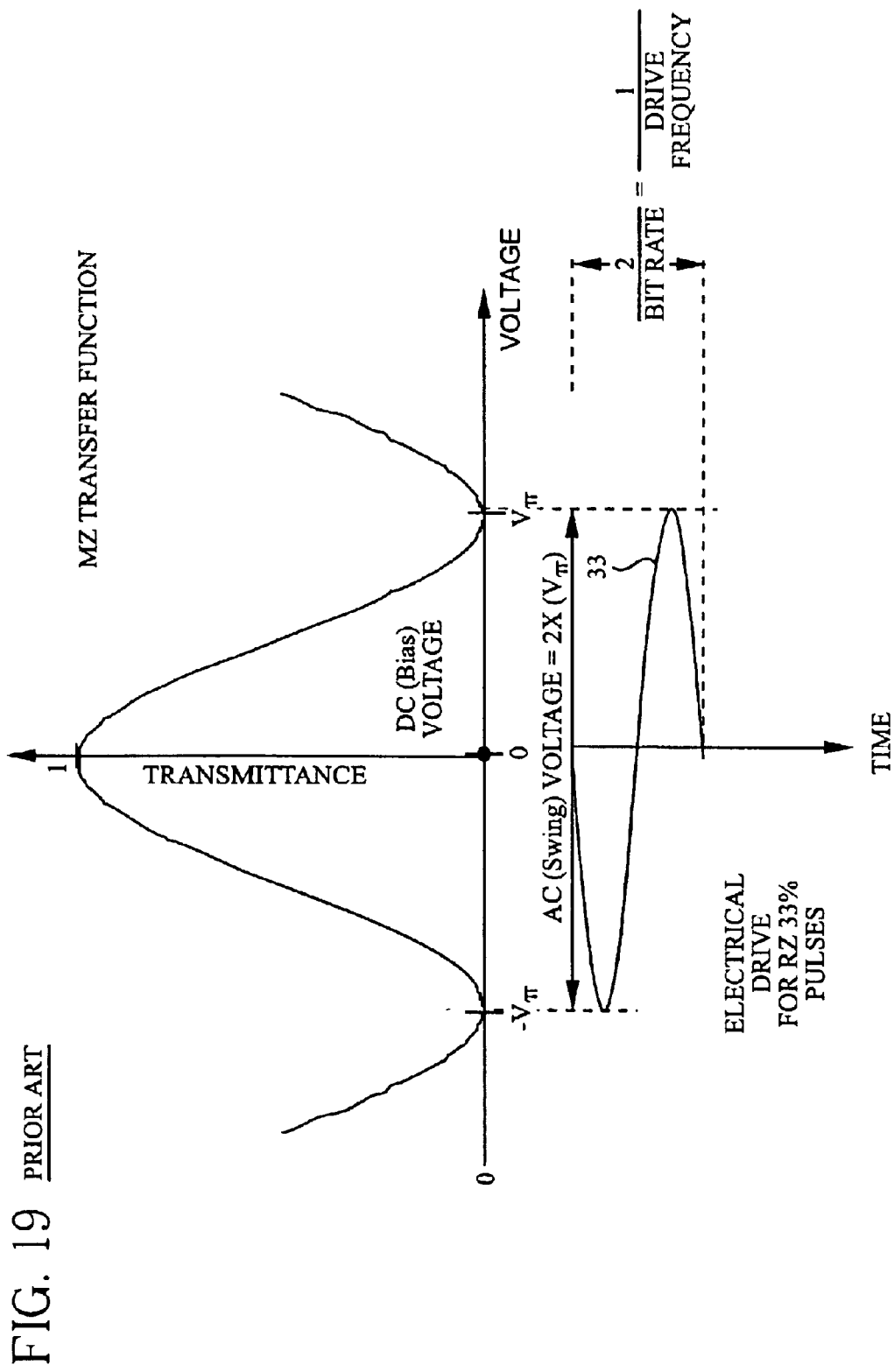
FIG. 19 is a transmittance transfer function and drive for standard RZ 33% pulse generation using the device 16 of FIG. 2 with the second MZI 160 formatted for RZ where the full symmetrical AC swing (from –Vpi to Vpi) is taken about the inflection point.
Figure 20:
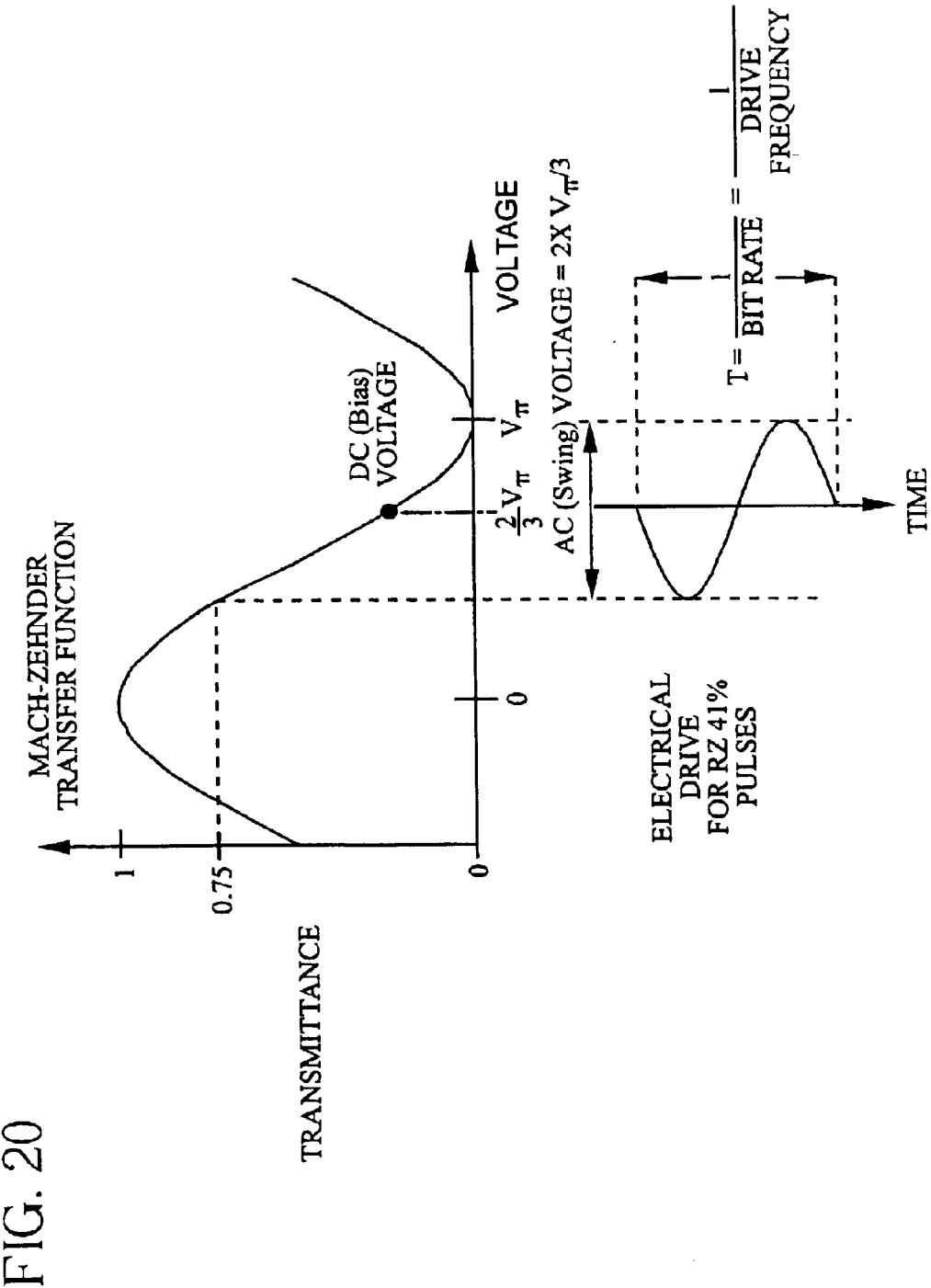
FIG. 20 is a transmittance transfer function and drive for variable duty cycle RZ 41% pulse generation using the device 16 of FIG. 2 with the second MZI 160 formatted for RZ where a less-than-full symmetrical AC swing (from 0.33 Vpi to Vpi) is taken about the DC bias voltage point and asymmetrically about the nominal inflection point, in accordance with the present invention.
Figure 21:
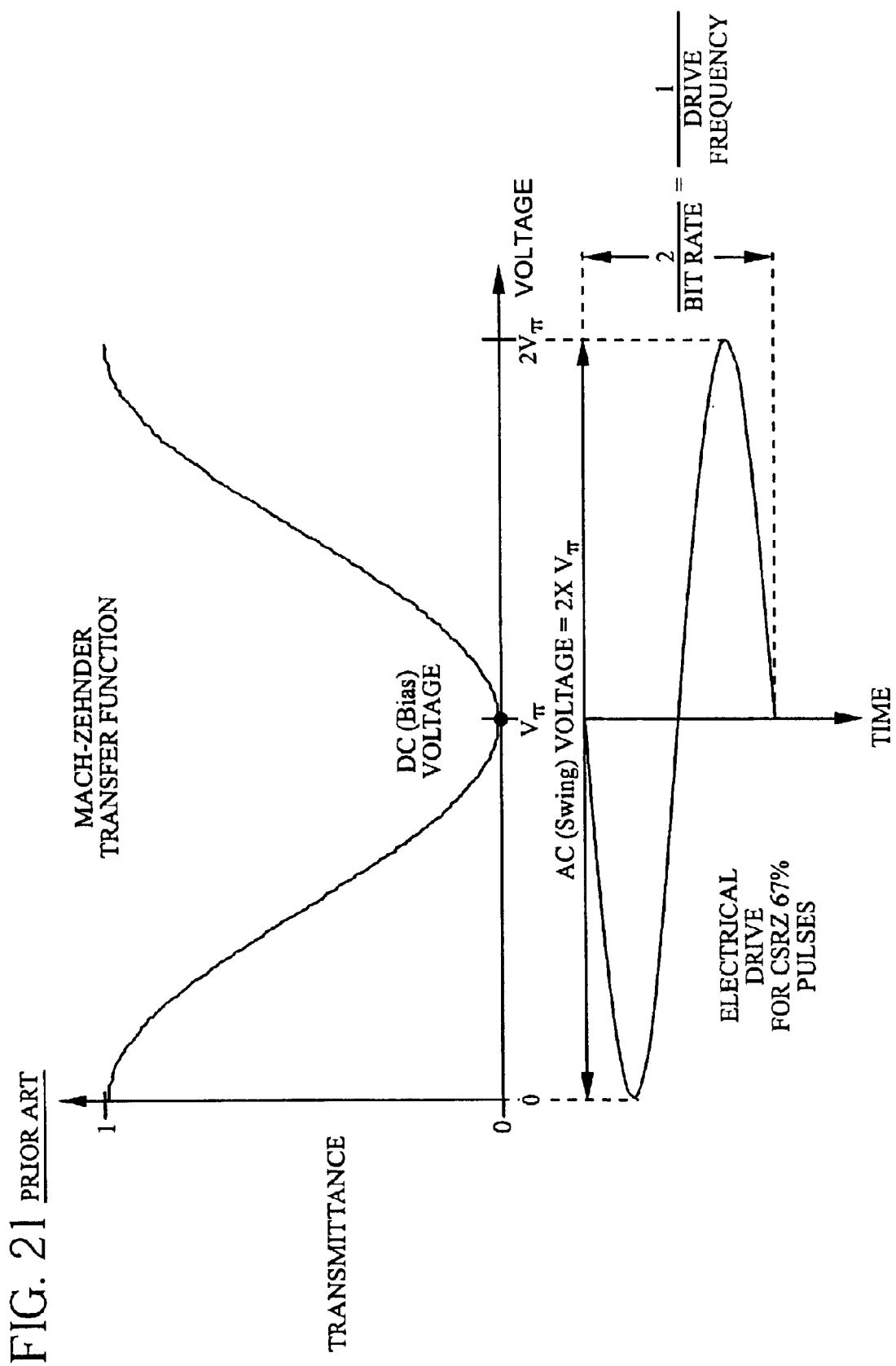
FIG. 21 is a transmittance transfer function and drive for standard CSRZ 67% pulse generation using the device 16 of FIG. 2 with the second MZI 160 formatted for CSRZ where the full symmetrical AC swing (from 0 to 2 Vpi) is taken about the inflection point.
Figure 22:
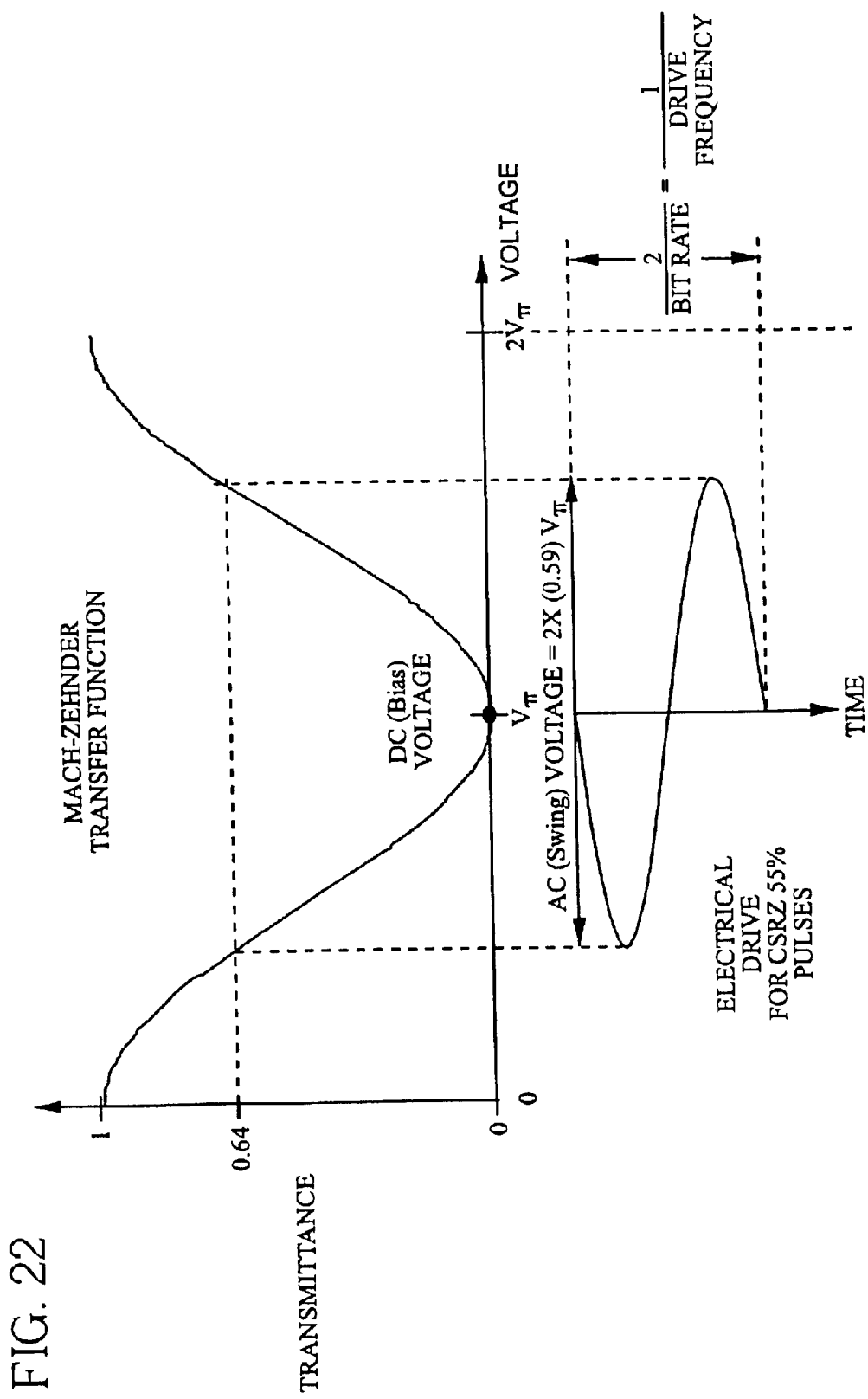
FIG. 22 is a transmittance transfer function and drive for variable duty cycle CSRZ 55% pulse generation using the device 16 of FIG. 2 with the second MZI 160 formatted for CSRZ where a less-than-full symmetrical AC swing (from 0.4 Vpi to 1.6 Vpi) is taken about the DC bias voltage point or nominal inflection point, in accordance with the present invention.

Referring to FIGS. 18–22, for the pulse width shaper 160 of FIG. 1 formatted as an RZ modulator in FIGS. 18–20 and as a CSRZ modulator in FIGS. 21–22, the transmittance which is the output power transmitted through the pulse width shaper 160 divided by the input power is depicted versus the applied voltage V, which is the combination of voltages $V_{DC}$ and $V_{AC}$. The Mach-Zehnder transfer function of the pulse width shaper 160 is thus shown as a transmittance versus drive voltage characteristic curve with a characteristic half-wave voltage, Vpi, situated midway between a pair of zero power transmittance derivative power points on the curve. The maximum transmittance which is maximum intensity divided by input power, at one of the zero power transmittance derivative power points, is normalized to unity (1) or 100% on the y-axis and is output from the pulse width shaper 160 when the pulse width shaper 160 loses or attenuates none of the power of the CW optical signal on a light input end 60A of FIG. 2 from destructive interference between the two branched arms 163. In general for standardized formats, the transmittance varies from 0 to 1 when the MZ modulator is biased at a DC bias voltage that is midway between a full AC swing between two zero power transmittance derivative power points, such as seen in FIGS. 18, 19, and 21. This standardized midway swing bias point is called an inflection point.

In accordance with the teachings of the present invention, to generate duty cycles, other than the known standardized formats of FIGS. 18, 19, and 21, the transmittance is forced to vary from 0 to less than 1 when the MZ modulator is biased at a DC bias voltage that is midway between a less-than-full AC swing between two zero power transmittance derivative power points, such as seen in FIGS. 20 and 22.

Referring back to FIG. 20, the DC voltage is between an inflection point or the DC bias voltage point of FIG. 18 and a half-wave point of the transmittance versus drive voltage characteristic curve. The AC voltage or less-than-full swing of FIG. 20, compared to FIG. 18, is a sinusoidally varying voltage having a drive frequency equal to the bit rate of the optical signal and a peak voltage equal to the magnitude of the difference between Vpi and the remainder of the DC voltage (Bias voltage $V_b$) when divided or normalized by twice Vpi. The resultant optical signal consists of optical pulses having an intensity with a return-to-zero (RZ) shape with a prescribed pulse width that depends on the amount of destructive optical interference between the first and second arms as tuned by the DC and AC voltages. (RZ).

In order to thus increase destructive interference, at least one unbalanced driving electrode 163D$_2$ of FIG. 1 and FIG. 2 is thus provided for applying a drive signal, $V_1(t)$ or $V_2(t)$, such as shown in FIG. 23A, that relates to the DC and AC voltages, such as shown in FIG. 23B, to at least one of the MZ arms, 20B$_1$ or 20B$_2$ such that the difference between the voltages of the two arms is equal to the sum of the DC voltage and twice the AC voltage.

Referring to FIGS. 23A–B, an applied voltage graph shows this relationship between the drive voltages $V_1(t)$ and $V_2(t)$ to provide the DC and AC voltages of the RZ 50% pulse of FIG. 18, derived using Example 1 and Equations (16-d7) and (16-d8), as compared to the RZ 41% pulse of FIG. 20, derived using Example 4 and Equations (16-d9) and (16-d10). The DC voltage of FIGS. 18 and 20 is related the bias voltage $V_b$ such that $V_{dc}=V_b$ in FIG. 23B. The AC swing voltage of FIGS. 18 and 20 is related to twice the absolute value of the parameter f such that $V_{ac}=2|f|$, as seen in FIG. 23B.

The respective magnitudes of the DC and AC voltages for setting the AC voltage and setting the DC voltage are predetermined such that the maximum power transmittance point on the MZ curve is less than 100% in FIG. 20 by not starting a less-than-full AC swing at the inflection point which is the center of the nominal DC voltage or $V_b$ for 50% RZ in FIG. 23B to reach Vpi as the required end-point for tuning the duty cycle for values other than 50%. Hence, the less-than-full AC swing is asymmetrical about the nominal inflection point. In FIG. 18 for the RZ 50% modulator, the transmittance varies from 0 to 1 during the bit period leading to half constructive and half destructive interference between the arms. However, in FIG. 20, for the RZ 41% pulse shaper, the transmittance varies from 0 to a maximum value of 0.75 or 75% during the bit period leading to more than half destructive interference between the arms. This 0.75 or 75% of maximum transmittance is represented by the region $D=V_{DC}-V_{AC}$ in FIG. 23B where a constant DC voltage area occurs and the swing to Vpi starts from the top edge of this constant DC area, instead of the bottom edge, as would the 50% RZ modulator of FIG. 18, to represents a relationship with the portion of constructive interference that was not used and added as destructive interference instead. The actual amount of destructive interference is represented by the following equation:

$$\Delta = \sin^2(\pi D/(2Vpi)) \qquad (16\text{-}d19)$$

Hence, for the 41% duty cycle RZ pulse, $\Delta$ is $\sin^2(\pi 0.3752 Vpi/(2Vpi)) = 0.25$. Using the same equation (16-d19) for 50% duty cycle RZ pulse, the actual amount of destructive interference $\Delta$ is zero because D is also zero.

In general, for such a tunable RZ modulator biased as in FIG. 20, the voltage $V_b$ is the amount of bias voltage $V_b$ applied to at least one arm of the pulse width shaper 160 that varies the maximum transmittance as a fraction of the maximum from 0 to $\sin^2(\pi V_b/Vpi)$. Hence, the portion not used is $1-\sin^2(\pi V_b/Vpi)$ which is equivalent to Equation (16-d19). Therefore, $1-\sin^2(90\ V_b/Vpi)=\sin^2(\pi D/(2Vpi))$. Thus, the left-over maximum transmittance $(1-\sin^2(\pi D/(2Vpi))=\sin^2(\pi V_b/Vpi)=1-0.25=0.75)$ for the 41% RZ pulse when the destructive interference Δ is 0.25 is 0.75 as reflected in FIG. 20.

The bias voltage $V_b$ is thus a measure of the amount by which a change in voltage V affects the transmission of the pulse shaper 160. The voltage $V_{DC}$ is applied to the pulse width shaper 160 and defines its static conversion of the CW optical signal or any other input optical signal 13 into an output optical signal 18 of FIG. 1 from the constructive interference between the arms. The time-varying voltage $V_{AC}$ is also applied to the pulse width shaper 160, so that the voltage V applied to the pulse width shaper 160 is the combination of voltages $V_{AC}$ and $V_{DC}$. In FIG. 20, as the voltage $V_{AC}$ of the electrical drive signal cycles through a first negative part of its period T, the voltage V applied to the pulse width shaper 160 is reduced until it reaches a minimum at $V_{DC}-V_{AC}$ corresponding to the peak transmittance of the optical signal output of the pulse width shaper 160. If $V_{AC} \geq V_{DC}$, the transmittance does not increase beyond the peak of 1 or 100%. Conversely, as the voltage $V_{AC}$ cycles through the positive half of its cycle, the voltage V applied to the pulse width shaper 160 reaches a maximum at $V_{DC}+V_{AC}$. At this part of the period T of the voltage $V_{AC}$, the destructive interference between the arms of the fields created by the CW optical signal or of the input optical signal 13 of FIG. 1, in general, by the pulse width shaper 160 is maximized, and the power of the optical signal output from the pulse width shaper 160 is a minimum. The half-wave point, $V_\pi$ or Vpi, corresponds to the voltage at which the pulse width shaper 160 totally destroys the CW or any other input optical signal 13 from the maximum destructive interference between the arms. Comparing this destructive cycle of the electrical drive of FIGS. 20 and 18, a portion of the constructive interference cycle of the electrical drive of the RZ 41% pulse shaper of FIG. 20 is seen to be shifted and swinging in what used to be the destructive interference cycle of the electrical drive of the RZ 50% modulator of FIG. 18. Hence, more destructive interference is added in FIG. 20 by the tunable RZ modulator. Accordingly, if $V_{DC}+V_{AC} \geq V_\pi$, the transmittance will be totally inhibited by the pulse width shaper 160.

The periodic voltage $V_{AC}$ thus results in generation of optical pulses with corresponding period T, such as in FIG. 23C. The duty cycle of the optical pulses generated by the pulse width shaper 160 is defined as the full width at one-half the maximum power intensity of the pulses, FWHM, divided by the period of the optical pulse signal T.

Referring to FIGS. 19 and 21, for the standardized formats, the transmittance similarly varies from 0 to 1 when the MZ modulator is again biased at a DC bias voltage that is midway between a full AC swing (referenced as 33 in FIG. 19, for example) of the electrical drive between two zero power transmittance derivative power points, such as −Vpi and +Vpi in FIG. 19 and 0 and 2Vpi in FIG. 21. The standardized midway swing bias point or the inflection point is at 0 in FIG. 19 for an RZ 33% RZ modulator and Vpi in FIG. 21 for a standard CSRZ 67% modulator. Each of such standard modulators has a transmittance that varies from 0 to 1 during each bit period with alternating phases in the optical field.

Referring to FIG. 22 to format or drive the pulse width shaper 160 of FIG. 1 as a tunable CSRZ modulator, the DC voltage, just like the standard 67% CSRZ modulator of FIG. 21 is biased at a half-wave point of the output transmittance versus drive voltage characteristic curve and the AC voltage comprises a sinusoidally varying voltage having a frequency equal to half the bit rate of the optical signal and a peak voltage less than Vpi. The resultant optical signal consists of optical pulses having an intensity with a return-to-zero (RZ) shape and a carrier suppressed return-to-zero (CSRZ) field shape with a prescribed pulse width that depends on the amount of destructive optical interference between the first and second arms as tuned by the peak of the AC voltage. (CSRZ)

In FIG. 21 for the CSRZ 67% modulator, the transmittance varies from 0 to 1 during the bit period, with alternating phases, leading to half constructive and half destructive interference between the arms. However, in FIG. 22, for the CSRZ 55% pulse shaper, the transmittance varies from 0 to a maximum value of 0.64 or 64% during the bit period, with alternating phases, leading to more than half destructive interference between the arms to produce a duty cycle or 55% for CSRZ pulses. In general, for such a tunable CSRZ modulator biased as in FIG. 22, the swing voltage $V_{AC}$ is the amount of swing applied to the composite arms of the pulse width shaper 160 that varies the maximum transmittance as a fraction of the maximum from 0 to $\sin^2(\pi V_{AC}/(2Vpi))$. (CSRZ-1)

Referring to FIG. 19 to format or drive the pulse width shaper 160 of FIG. 1 as a tunable RZ modulator, the DC voltage, just like the standard 33% RZ modulator of FIG. 19, with a full swing 33, is biased at the zero or starting wave point of the output transmittance versus drive voltage characteristic curve and the AC voltage comprises a sinusoidally varying voltage having a frequency equal to half the bit rate of the optical signal and a peak voltage less than Vpi, as represented by the less-than full swing 45. The resultant optical signal consists of optical pulses having an intensity with a return-to-zero (RZ) shape with a prescribed pulse width that depends on the amount of destructive optical interference between the first and second arms as tuned by the peak of the AC voltage. (RZ biased at 0) The transmittance thus varies from 0 to 1 during the bit period, leading to half constructive and half destructive interference between the arms. Hence, the AC swing is symmetrical about the nominal inflection point but is less than the full nominal full AC swing.

Thus, varying either singly or in combination, the swing and/or the bias of the basic pulse width shaper 160 of FIG. 1 to shape the pulse width of another data modulator that could be of any encoding format placed in front or after the pulse width shaper, with or without an additional phase modulator, various combinations of modulator configurations are possible. The basic pulse width shaper 160 of FIG. 1 could be formatted as a single modulator or multiple concatenations of itself, for varying the duty-cycle from about 0% to about 67%. As an RZ modulator, singly or in multiple concatenations of itself, the duty cycle can be varied by changing the asymmetrical less-than-full AC swing about the nominal inflection point. Alternatively, the basic pulse width shaper 160 of FIG. 1 could be formatted for a CSRZ modulator for varying the duty-cycle by changing the symmetrical less-than-full AC swing about the nominal inflection point. These two basic pulse width shapers can then be used alone or in multiple concatenations, for an RZ shape or CSRZ shape, respectively, in combination with each other for a CSRZ shape, or duplicates of the same type for a RZ shape or a CSRZ shape, or used with other encoding formatters, such as duobinary, PSK, or AMI. Though not exhaustive, the following examples show various combinations that are possible. For convenience and not meant to be limiting, the claims that follow are referenced by one of these examples.

EXAMPLE 5

Figure 5:
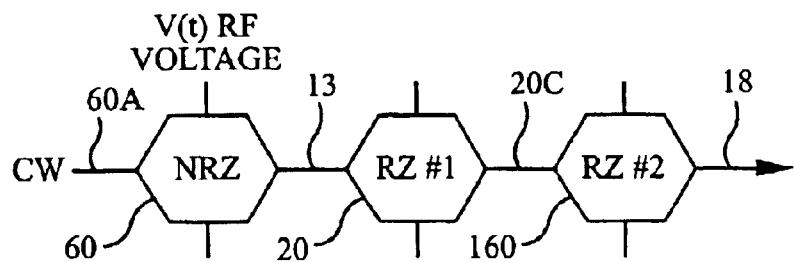
FIG. 5 is a schematic diagram of the basic apparatus 16 of FIG. 1 formatted for variable duty cycle RZ pulse generation using two concatenated MZI's of FIG. 1 as RZ Mach-Zehnder modulators 20 and 160, in accordance with the present invention.
Figure 27:
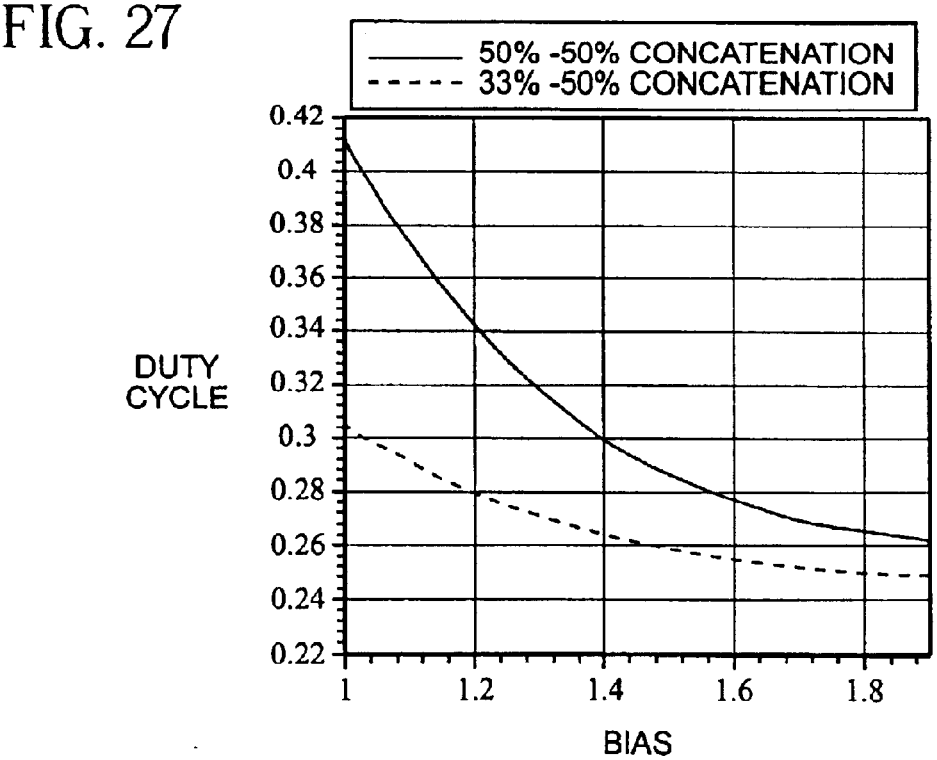
FIG. 27 is a graph of variable RZ duty cycle as a function of the bias coefficient of one of the two concatenated MZI's of FIG. 5 formatted as RZ Mach-Zehnder modulators 20 and 160, such that both the bias and swing parameters of the modulator are varied, when the other RZ modulator is formatted for the standard 50% or 33% fixed duty cycles, in accordance with the present invention. When both the Mach-Zehnder modulators 20 and 160 are nominally formatted to generate 50% duty cycle pulses, the bias and swing parameters of one modulator is kept equal to those of the other modulator but are both varied in accordance with the present invention.

Variable Duty Cycle RZ Pulses With Two Concatenated Mach-Zehnder Modulators, One of the Modulators With Fixed Parameters, and the Other Modulator With Bias and Swing Parameters Both Tunable Referring to the set-up of FIG. 5, RZ pulses with tunable duty cycles may also be generated. Unlike traditional RZ pulse generation, this method employs two RZ Mach-Zehnder modulators 20 and 160, controlled in accordance with the present invention that are connected in series. First, as in FIG. 2, CW light is sent into an NRZ modulator 60, wherein the bit stream is impressed upon the CW beam in the form of an RF voltage. The incoming optical beam 13 is modulated using a standard return-to-zero (RZ) data stream having a duty cycle of 50% (Example 1) or a standard RZ data stream having a duty cycle of 33% (Example 2) or the output optical signal 18 of FIG. 1 is modulated with one of the aforementioned RZ data streams instead. The output 18 of the combined setup is a pulse train of optical pulses having an intensity with an RZ shape with a prescribed pulse width that depends on the amount of destructive optical interference between the first and second arms as tuned by the DC and AC voltages. The resultant pulse width corresponds to a duty cycle that ranges from about 32.5% and 41% in the case when the data stream is of the type from Example 1 (as shown in FIG. 28) and a duty cycle that ranges from about 25% and 31% in the case when the data stream is of the type from Example 2 (as shown in the gray curve of FIG. 27). (RZ-2)

Hence, in accordance with the present invention, dual-drive Mach-Zehnder modulators allow for independent control of chirp $\alpha'$ and swing s parameters of the Mach-Zehnder modulator by independently specifying $f_1$ and $f_2$, as given in Eqs. (4) and (5). A particular consequence of this independent control is the ability of dual-drive modulators to produce chirp-free pulses; i.e., the output pulses have constant phase. Chirp-free pulses are produced by setting $f_1=-f_2$, which results in a chirp parameter $\alpha'=0$. The output optical field given in Eq. (18) is evidently chirp-free because both of the RZ modulators are dual-drive and therefore add no chirp to the signal. However dual-drive modulators are quite expensive compared with single drive modulators. In these single-drive modulators, the RF driving voltage is applied to only one arm of the MZM. Thus either $f_1$ or $f_2$ must be equal to zero.

EXAMPLE 6

Variable Duty Cycle RZ Pulses With Two Concatenated Mach-Zehnder Modulators, One of the Modulators With Fixed Parameters, and the Other Modulator With Swing Parameter Fixed, and the Bias Parameter Tunable In FIG. 5, an alternative approach is the concatenation of one dual-drive chirp-free modulator using the parameters given in Example 2 for 50% duty cycle pulses with a second dual-drive modulator 160 using the nominal parameters given in Example 1 for a usual 50% duty cycle but with an arbitrary bias coefficient $\xi$. The output 13 of the NRZ modulator 60 is passed into a first RZ modulator 20 that is biased to generate 50% duty cycle pulses. Finally, the light passes through a second RZ modulator 160, which has the same parameters as the first RZ modulator 20, except that the bias coefficient $\xi$ is left as a free parameter in the second RZ modulator. The output optical field at the end of the second modulator 18 is given by $$E(t) = E_0(t)\cos\left[\frac{\pi}{2}\cos(2\pi Bt)\right]\cos\left[\frac{\pi}{4}\cos(2\pi Bt) + \frac{\pi\xi}{4}\right]\exp\left[-i\frac{\pi}{4}(1+\xi)\right] \quad (18)$$

The graph of the variation of the duty cycle of the output pulses as a function of the bias coefficient of the RZ modulator 60 is shown in FIG. 25A. For extremely short duty cycles (<20%), a sidelobe grows at the expense of the central peak, but continuously varying duty cycles between about 41% and 23% may be generated while keeping relative sidelobe intensity below 10% by varying the bias coefficient $\xi$.

In FIG. 5, yet another alternative approach is the concatenation of one dual-drive chirp-free modulator 20 using the parameters given in Example 2 for 33.3% duty cycle with a second dual-drive modulator 160 using the nominal parameters given in Example 1 for a usual 50% duty cycle but with an arbitrary bias coefficient $\xi$. Using the nominal 50% duty cycle parameters for the second modulator, the bias coefficient is adjusted by changing the bias coefficient $\xi$ of the RZ modulator 160 between its nominal value of 1 and a maximum value of 2.4 from what was nominally set to vary the duty cycle. In this case, the output optical field at the end of the second modulator 18 is given by $$E(t) = E_0(t)\cos\left[\frac{\pi}{2}\cos(\pi Bt) + \frac{\pi}{4}\right]\cos\left[\frac{\pi}{4}\cos(2\pi Bt) + \frac{\pi\xi}{4}\right]\exp\left[-i\frac{\pi}{4}\xi\right] \quad (19)$$

This configuration allows the generation of RZ pulses with a selectable duty cycle for optimizing system performance that can be selected from a continuously varying range of potential duty cycles between about 43% and 17% while keeping relative sidelobe intensity below 10%, as seen in FIG. 25–B. It is not possible to generate chirp-free RZ pulses using Example 6 by means of single-drive modulators due to the difference in the RF driving functions between the two 50% and 33% duty cycle RZ modulators and also because of the fact that the RZ modulator 20 has fixed operating parameters.

EXAMPLE 7

Figure 6:
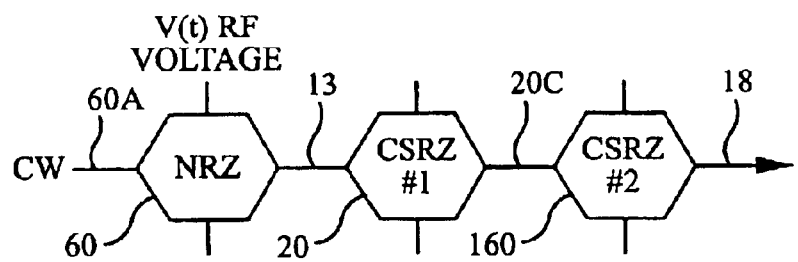
FIG. 6 is a schematic diagram of the basic apparatus 16 of FIG. 1 formatted for variable duty cycle RZ pulse generation using two concatenated MZI's of FIG. 1 as CSRZ Mach-Zehnder modulators 20 and 160, in accordance with the present invention.
Figure 26:
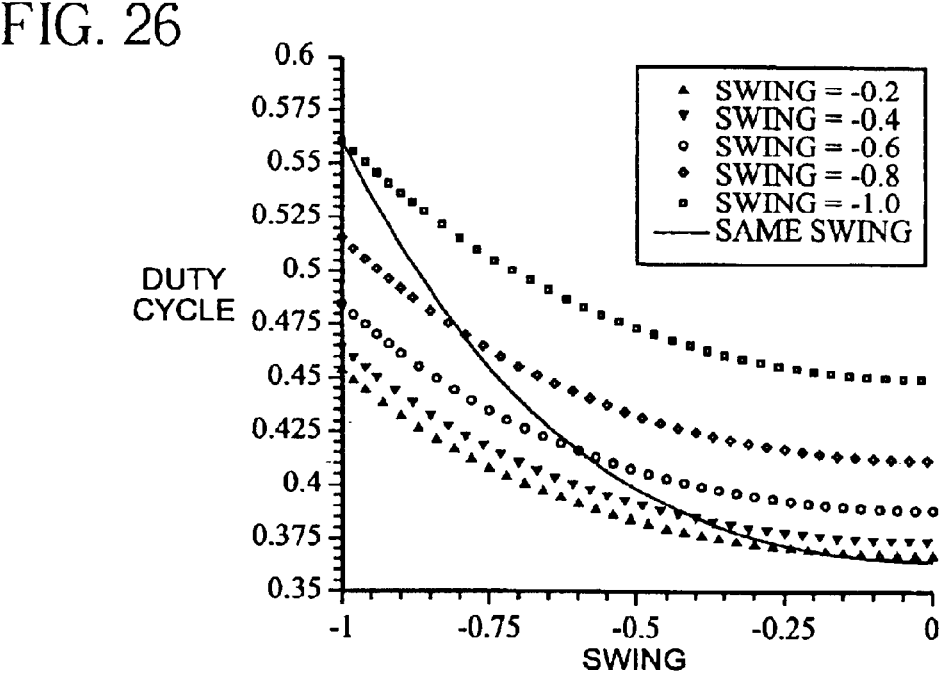
FIG. 26 is a graph of variable RZ duty cycle as a function of the swing of at least one of the two concatenated MZI's of FIG. 6 formatted as CSRZ Mach-Zehnder modulators 20 and 160, in accordance with the present invention.

Variable Duty Cycle RZ Pulses With Two Concatenated CSRZ Mach-Zehnder Modulators Referring to FIG. 6, the NRZ Mach-Zehnder modulator 60 is followed by two modulators 20 and 160, set-up as concatenated CSRZ modulators. The incoming optical beam 13 is modulated using a standard carrier-suppressed return-to-zero (CSRZ) data stream having a duty cycle of 67% or the output optical signal 20C is modulated with such a CSRZ data stream. The output 18 of the combined setup will be a pulse train of optical pulses having a field amplitude with a CSRZ shape with a prescribed pulse width that depends on the amount of destructive optical interference between the first and second arms as tuned by the DC and AC voltages such that the pulse width corresponds to a duty cycle that ranges from about 56% and 36% as seen in FIG. 26 generally when both the CSRZ are allowed to swing from the nominal 67% CSRZ duty cycle pulses.

Specifically, when the incoming optical beam 60C from the output of the NRZ modulator 60 is modulated using a standard carrier-suppressed return-to-zero (CSRZ) data stream by the first CSRZ modulator 20 with a fixed duty cycle of 67% or the output optical signal 18 of the second CSRZ modulator 160 is modulated with the fixed 67% CSRZ data stream. The output of the combined setup are optical pulses having an intensity with an RZ shape with a prescribed pulse width that depends on the amount of destructive optical interference between the first and second arms as tuned by the peak of the AC voltage of the variable CSRZ modulator 160 such that this pulse width corresponds to a duty cycle that ranges between about 45% and 56% as seen by the open square curve of FIG. 26. (RZ-4)

The output optical field at the end of the second CSRZ modulator 18 is given by $$E(t) = E_0(t) \sin\left[\frac{\pi s_1}{2}\sin(\pi Bt)\right]\sin\left[\frac{\pi s_2}{4}\sin(\pi Bt)\right]\exp\left[-i\frac{\pi}{2}\{(s_1\alpha_1' + s_2\alpha_2')\sin(\pi Bt) - 1\}\right] \quad \text{(Eq. 20)}$$

where $E_0(t)$ is the value of the field coming into the first CSRZ modulator 20. Both modulators 20 and 160 are nominally set to 66.7% duty cycle CSRZ parameters, but the key difference is that the swing parameters of each of the modulators $s_1$ and $s_2$ are allowed to vary independently using equations 16-d11 and 16-d12. In FIG. 26, the solid line denotes the duty cycle variation when both swings are the same while the other duty cycle curves show the duty cycle variation when one swing is fixed, for example at the nominal swing for 66.7% duty cycle while the other swing is changed from nominal, according to equations 16-d11 and 16-d12. Hence, by varying the swings of the CSRZ modulators 20 and 160, RZ pulses with continuously varying duty cycles between about 56% and 36% may be produced. This configuration has the additional advantage of enabling chirp-free pulses using single-drive modulators since the CSRZ modulators may be operated with chirp values that are equal in magnitude but opposite in sign.

The incoming optical beam of a second CSRZ formatted modulator is the output of a first MZ modulator formatted for CSRZ pulses. The output of the such a combined setup of two CSRZ modulators are optical pulses having an intensity with an RZ shape with a prescribed pulse width that depends on the amount of destructive optical interference between the first and second arms as tuned by the peaks of the AC voltages such that this pulse width corresponds to a duty cycle that ranges between 36% and 56%. (RZ-5)

EXAMPLE 8

Variable Duty Cycle RZ Pulses With Two Concatenated RZ Mach-Zehnder Modulators, With the Bias and Swing Parameters of Both Modulators Allowed to Vary Referring back to FIG. 5, another important variation is the case where the incoming optical beam 13 of FIG. 1 of a second RZ modulator 160 can be the output 20C of another first RZ formatted MZ modulator 20. The output 18 of the combined setup being optical pulses having an intensity with an RZ shape with a prescribed pulse width that depends on the amount of destructive optical interference between the first and second arms as tuned by the DC and AC voltages such that this pulse width corresponds to a duty cycle that ranges between about 26% and 41% as shown in the black curve of FIG. 27. The key feature of this example is that the bias and swing parameters of the RZ modulator 20 are set equal to those of the RZ modulator 160 but they are allowed to vary in accordance with the prescription of Example 4. This method of Example 8 for generating short duty cycle RZ pulses is an improvement upon Examples 5 and 6 in that the pulses do not have any sidelobes.

(RZ-3)

The traditional disadvantage inherent in the configuration shown in FIG. 5 is that when single drive Mach-Zehnder modulators are used, the chirp parameter α' is necessarily non-zero, therefore the pulses are chirped. Such chirped pulses may experience additional dispersion penalty due to propagation or may have additional spectral content resulting in linear cross-talk penalty. It is thus advantageous to realize a scheme to combine the inexpensive features of single-drive Mach-Zehnder modulators with the chirp-free character of dual-drive Mach-Zehnder modulators. This may be done in practice by concatenating the first single-drive RZ modulator with another of equal but opposite chirp so as to produce zero overall chirp. The output optical field has the same form as that obtained from two concatenated dual drive RZ modulators, thus all the duty cycle variation with respect to the bias of the second RZ modulator are the same as that observed in the concatenated dual drive modulators case of Example 8.

EXAMPLE 9

Variable Duty Cycle CSRZ Pulses With Concatenated RZ and CSRZ Modulators

Figure 7:
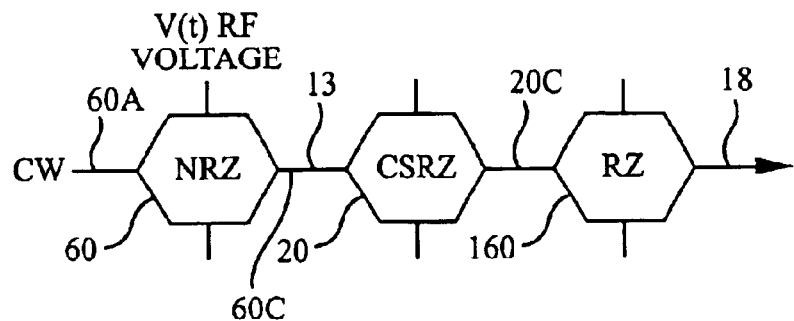
FIG. 7 is a schematic diagram of the basic apparatus 16 of FIG. 1 formatted for variable duty cycle CSRZ pulse generation using two concatenated MZI's of FIG. 1 as a CSRZ modulator 20 and a RZ Mach-Zehnder modulator 160, in accordance with the present invention.
Figure 8:
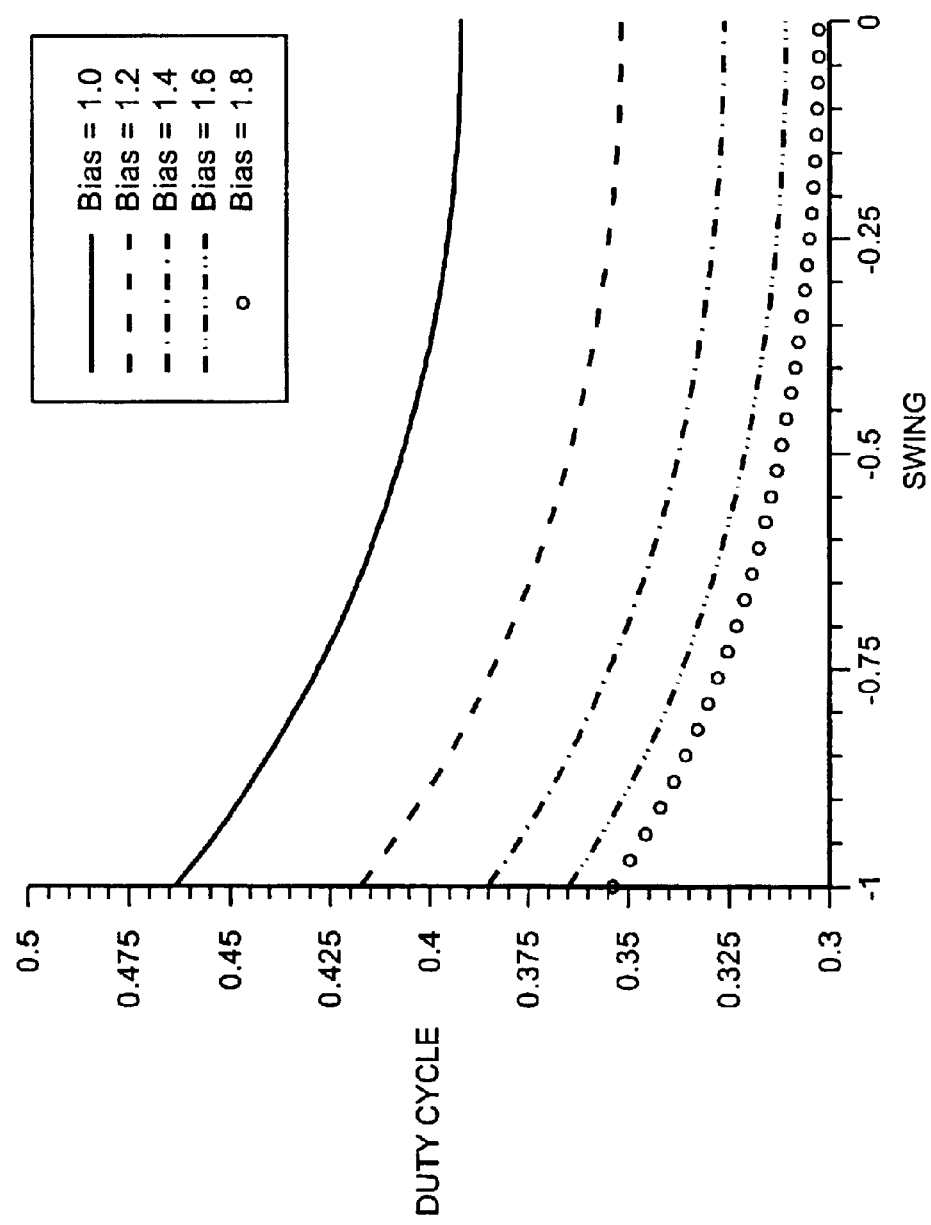
FIG. 8 is a graph of variable duty cycle of the apparatus 16 of FIG. 7 as a function of swing of the CSRZ modulator 20 for various bias settings of the RZ modulator 160, in accordance with the present invention.

Referring to FIG. 7, CSRZ pulses with short tunable duty cycles are generated by appending the pulse width shaper 160 formatted as an RZ modulator 160 with variable bias and swing to concatenated NRZ 60 and CSRZ 160 modulators. The incoming optical beam 20C from the NRZ modulator 60 impressed upon by a second CSRZ modulator 20 is modulated using a standard return-to-zero (RZ) data stream with a duty cycle of 50% or the output optical signal 18 is modulated with the RZ data stream by the NRZ and CSRZ modulators configured after the RZ modulator. The output of the combined setup are optical pulses having a field amplitude with a CSRZ shape with a prescribed pulse width that depends on the amount of destructive optical interference between the first and second arms of the CSRZ modulator 20 as tuned by the peak of the AC voltage such that this pulse width corresponds to a duty cycle that ranges between about 40% and 46% as seen by the solid black curve with bias coefficient=1 of FIG. 8, when the bias is fixed for 50% duty cycle in the RZ modulator 160. (CSRZ-3)

Figure 9:
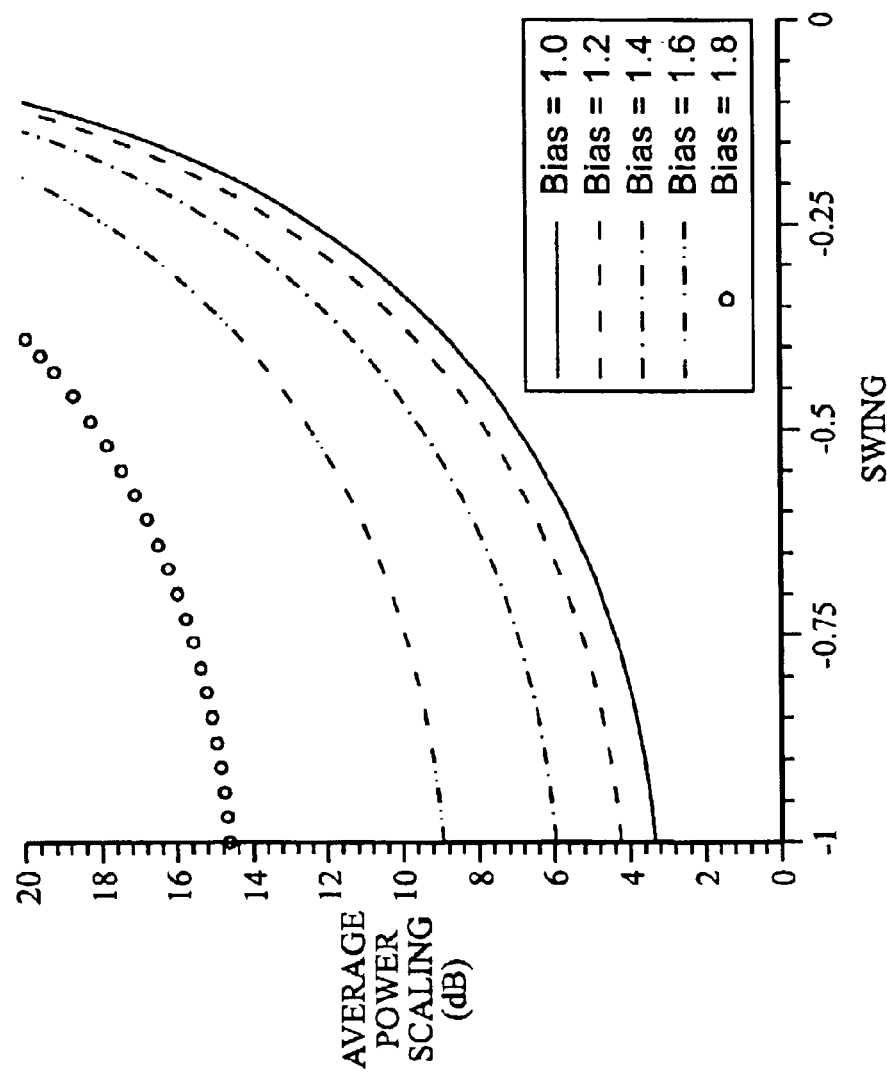
FIG. 9 is a graph of the average power scaling factor as a function of swing of the CSRZ modulator 20 for various bias settings of the RZ modulator 160 for the apparatus 16 of FIG. 8, in accordance with the present invention.

As in the previous examples, the swing $s_2$ of the RZ modulator is related to its bias coefficient $\xi_2$ by $s_2 = 1 - \xi_2/2$. The resulting output pulses using a CSRZ swing of $s_1$ are described by $$E(t) = E_0(t) \sin\left[\frac{\pi s_1}{2}\sin(\pi Bt)\right]\cos\left[\frac{\pi s_2}{4}\cos(2\pi Bt) + \frac{\pi \xi_2}{4}\right]\exp\left[-i\frac{\pi}{2}\left\{s_1\alpha'_1\sin(\pi Bt) + s_2\alpha'_2\cos(2\pi Bt) - \frac{\xi_2}{2} - 1\right\}\right]$$ eq. (21)

where $E_0(t)$ is the input NRZ field and $\alpha'_1$ and $\alpha'_2$ are the chirp parameters of the CSRZ and RZ modulators, respectively. The resulting CSRZ duty cycles are plotted in FIG. 8 for various bias settings of the RZ modulator. By varying the swing of the CSRZ modulator and the bias and swing parameters of the RZ modulator, CSRZ pulses with tunable duty cycles between 46% and 30% are obtained. The average power scaling factor is plotted in FIG. 9. Because of the difference in clock frequencies between the CSRZ and RZ driving voltages used with this method, chirp-free pulses may only be generated when both modulators are dual-drive.

Hence, in general, referring to FIG. 7, either the incoming optical beam 20C is the output of a first modulator 20 formatted for CSRZ or the output optical signal 20C is passed as input to a second modulator 160 formatted for RZ. The output 18 of the combined setup are optical pulses having a field amplitude with a CSRZ shape with a prescribed pulse width that depends on the amount of destructive optical interference between the first and second arms as tuned by the peak of the AC voltage of the first modulator 20 and the DC and AC voltages of the second modulator 160 such that this pulse width corresponds to a duty cycle that ranges between about 30% and 46%. (CSRZ-4)

EXAMPLE 10

Variable Duty Cycle alphaRZ-1 Pulses

Figure 10:
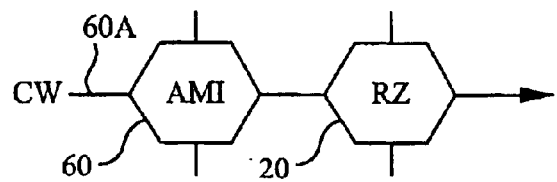
FIG. 10 is schematic diagram of the basic apparatus 16 of FIG. 2 for variable duty cycle alphaRZ-1 pulse generation using a single RZ Mach-Zehnder modulator 20 and an AMI data modulator 60, in accordance with the present invention.

Referring to FIG. 10, variable duty cycle alphaRZ-1 pulses are generated by passing AMI pulses from a first AMI modulator 60 through an RZ modulator 20 with tunable bias and swing parameters. The incoming optical beam 60A is modulated using an alternate mark inversion (AMI) data stream by the first AMI modulator 60 or the output optical signal of the second RZ modulator 20 is modulated with the AMI data stream. The output of the combined setup are optical pulses having an alternate phase modulation governed by the AMI data stream and an intensity with an RZ shape with a prescribed pulse width that depends on the amount of destructive optical interference between the first and second arms of the RZ modulator 20 as tuned by the DC and AC voltages such that this pulse width corresponds to a duty cycle that ranges between 37% and 50%. (alphaRZ-1)

Figure 11:
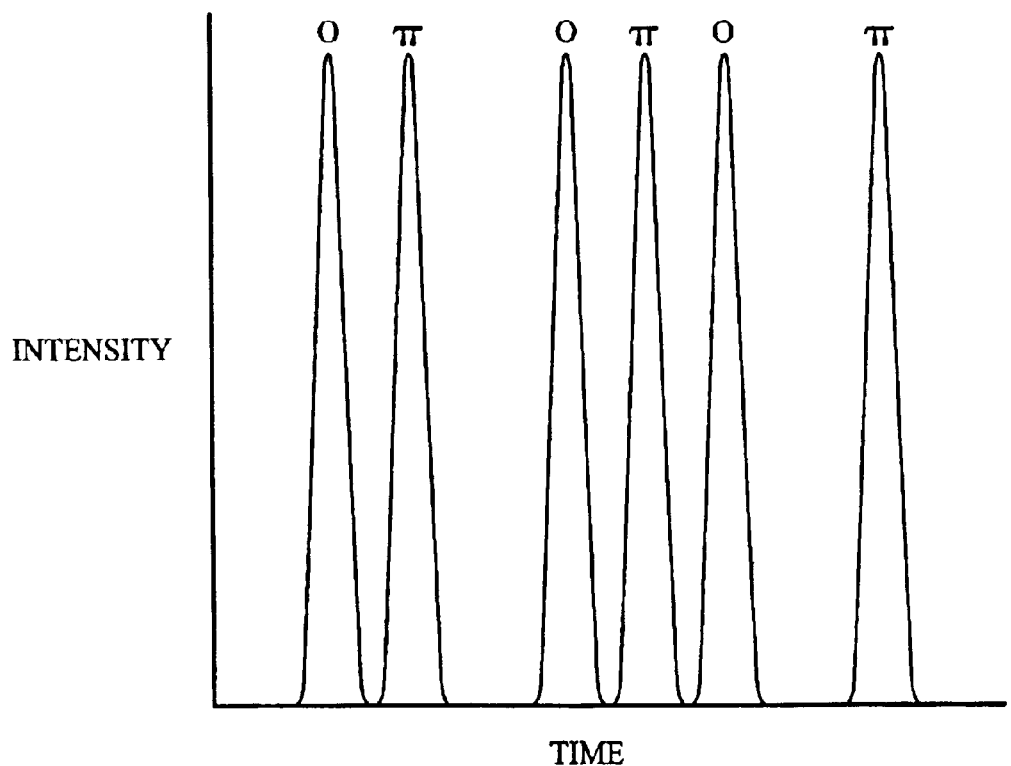
FIG. 11 is a representation of an alphaRZ-1 signal provided by the basic apparatus 16 of FIG. 10, in the time domain, where very "ONE" bit is phase-shifted by n from the closest "ONE" bits at either side, in accordance with the present invention.

The resulting alphaRZ-1 duty cycles are the same as in the RZ case (FIG. 3), which assumes a short rise/fall time for the AMI modulator 60. If a longer rise/fall time is used, then even shorter duty cycle alphaRZ-1 pulses may be generated. Whereas standard RZ pulses have the same phase characteristics, each "one" bit in an alphaRZ-1 signal is $\pi$ phase-shifted from its two neighboring "one" bits, as shown in FIG. 11. This phase shifting acts to cancel out intra-channel four-wave mixing (FWM) and cross-phase modulation (XPM).

Alternatively, instead of formatting the first modulator 60 for the AMI data stream, the first modulator 60 can be formatted for a duobinary data stream for use as a duobinary modulator 60 in FIG. 2. Hence, the incoming optical beam on the input arm 60A is modulated using a duobinary data stream or the output optical signal of the second modulator 20 formatted for CSRZ, is modulated with the duobinary data stream. The output of the combined setup has optical pulses having an alternate phase modulation governed by the duobinary data stream and phase modulation of the CSRZ modulator 20. The pulses have a prescribed pulse width that depends on the amount of destructive optical interference between the first and second arms of the CSRZ modulator 20 as tuned by the peak of the AC voltage such that this pulse width corresponds to a duty cycle that ranges between 50% and 67%. (alphaRZ-2)

In another variation, using FIG. 2, the first modulator 60 is formatted for duobinary to be used as a duobinary modulator 60 and the second modulator 20 is formatted for RZ to be used as an RZ modulator 20. The incoming optical beam 60A is modulated using a duobinary data stream or the output optical signal of the RZ modulator 20, if the positions of the two modulators are interchanged, is modulated with the duobinary data stream from the data source 22. The output 18 of the combined setup of the two modulators, sequenced either way, are optical pulses having phase shifts governed by the duobinary data stream and an intensity with an RZ shape with a prescribed pulse width that depends on the amount of destructive optical interference between the first and second arms of the RZ modulator as tuned by the DC and AC voltages such that this pulse width corresponds to a duty cycle that ranges between 37% and 50%. (Duobinary-RZ)

In yet another variation, using FIG. 2, the first modulator 60 is formatted for phase-shift keyed (PSK) to be used as a PSK modulator 60 and the second modulator 20 is formatted for RZ to be used as an RZ modulator 20. The incoming optical beam 60A is thus modulated using a phase-shift keyed (PSK) data stream or the output optical signal on the output arm 20C the RZ modulator 20, if the positions of the modulators 60 and 20 are interchanged, is modulated with the PSK data stream. The output 18 of the combined setup, with either sequence of modulators 60 and 20, or 20 and 60, are optical pulses having a phase modulation governed by the PSK data stream and an intensity with an RZ shape with a prescribed pulse width that depends on the amount of destructive optical interference between the first and second arms of the RZ modulator 20 as tuned by the DC and AC voltages such that this pulse width corresponds to a duty cycle that ranges between 37% and 50%. (RZ-PSK)

Referring to FIGS. 1 and 12–15, the system 10 can include an optical parallel-serial converter for converting N synchronous data streams, each having a nominal data pulse width, from parallel to serial form for optically time multi-plexing into an optical communication link. Even though only one fiber span 19 is shown, it is appreciated that this single fiber span 19 can represent a plurality of parallel fiber spans already known in the field. The optical communication link is preferably a network of optical fibers which can include a plurality of amplifiers 29, positive and negative dispersion fibers 19 for repeating the multiplexed signal over the fibers 19. For such a time division multiplexing (TDM) system 10, amplitude shift keying modulation techniques of the return to zero (RZ) format is usually used for time multiplexing N synchronous RZ data streams, each having a bit period of T or 1/B, before multiplexing or the parallel-to-serial conversion, and pulsing at a bit rate of B or 1/T into a serial data sequence of short pulses operating at a multi-plexed bit rate or baud rate of N/T or NB for multiplexing into the optical communication link within a frame. The advantages of the variable duty cycle RZ pulses produced in this manner are demonstrated by comparing the performance in ten 80 Ian spans 19 of dispersion managed fiber (DMF) comprised of a length of dispersion slope compensating fiber situated between lengths of a large effective area fiber. The dispersion values of the large effective area and dispersion slope compensating fiber 19 are about +19 and −29 ps/nm/km and both fibers 19 have a ratio of dispersion to dispersion slope of about 310 nm. The bit rate (B) of the system 10 is 40 Gb/s and the spectral efficiency is 0.4 for the performance graphs of FIGS. 12–15. Pre- and post-compensation are optimized to reduce intra-channel nonlinear penalties and are chosen to be −750 ps/nm and −250 ps/nm, respectively; in this case, there is no residual dispersion. Since in real systems 10 there is likely to be some finite residual dispersion, the post-compensation is varied in order to obtain residual dispersion values between −30 and 30 ps/nm, thereby testing the robustness of the modulation formats with respect to this impairment. The performance of the center of three launched channels for channel powers ranging from −3 to +6 dBm have been simulated.

Such a variable duty cycle RZ pulse generation has also been experimentally shown to provide the advantages of RZ with 42% duty cycle in a 10 Gb/s LEAF system at 0.2 spectral efficiency.

FIGS. 12–14 show Q values for the various modulation formats with fixed average launch powers of −1, 1, and 3 dBm, respectively. FIG. 15 shows the Q values for the various levels of residual dispersion after optimizing over all power levels. In all cases, Q values are reported in dB units (dBQ=10 $\log_{10}$Q) for the middle channel and calculated using optimized electrical and optical filter bandwidths for each format. The duty cycles of the RZ, CSRZ, and alphaRZ-1 pulses have been optimized to provide the best possible performance. The optimal duly cycles of these formats are in the range of 37 to 41% for RZ and alphaRZ-1 and between 33 and 38% for CSRZ. The solid lines in FIGS. 12–15 represent the performance of the inventive variable duty cycle formats, such as Alpha-RZ Optimized (or alphaRZ-1), alphaRZ-1 50% (or alphaRZ-1 with RZ 50% duty cycle used), CSRZ Optimized (CSRZ-4) and RZ Optimized (RZ-1).

The results in FIG. 15 show that while AMI provides excellent performance at 0 ps/nm residual dispersion, its Q value rapidly deteriorates at even small values of finite residual dispersion. However variable duty cycle RZ and CSRZ formats provide comparable performance to AMI at 0 ps/nm residual dispersion, but perform significantly better at finite values of residual dispersion (up to 1.8 dBQ better at −30 ps/nm and 2.1 dBQ better at 30 ps/nm).

Figure 16A:
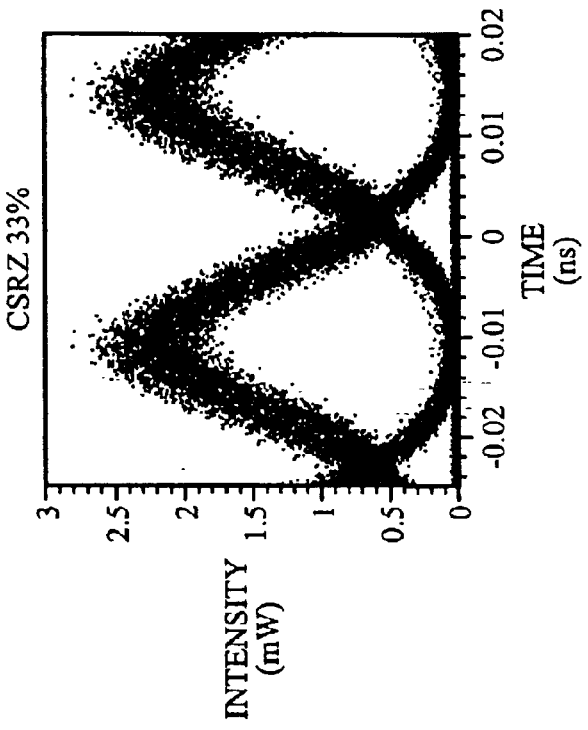
FIGS. 16A–B are comparisons of eye diagrams of alphaRZ-1 pulse generation using the device 16 of FIG. 10 and CSRZ 33% pulse generation of the device 16 of FIG. 2 with the second MZI 160 formatted for CSRZ using the method shown in FIG. 7 after propagation through the 40 Gb/s system with –30 ps/nm net residual dispersion, in accordance with the present invention.
Figure 16B:
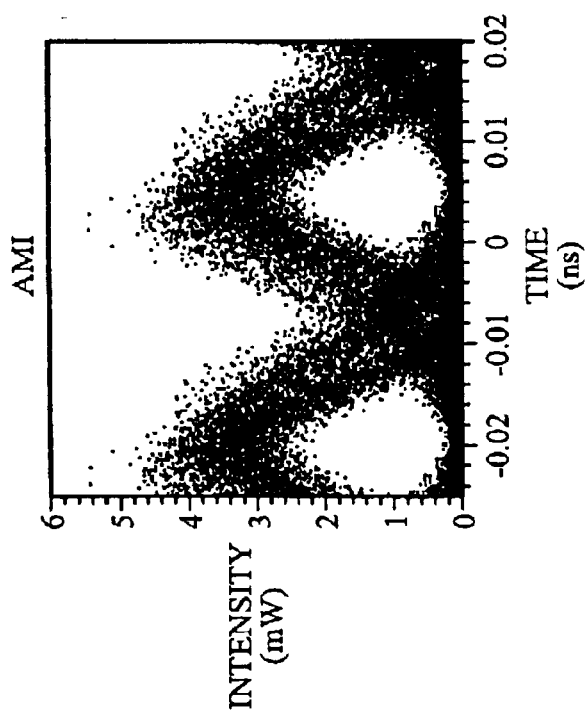
Figure 17A:
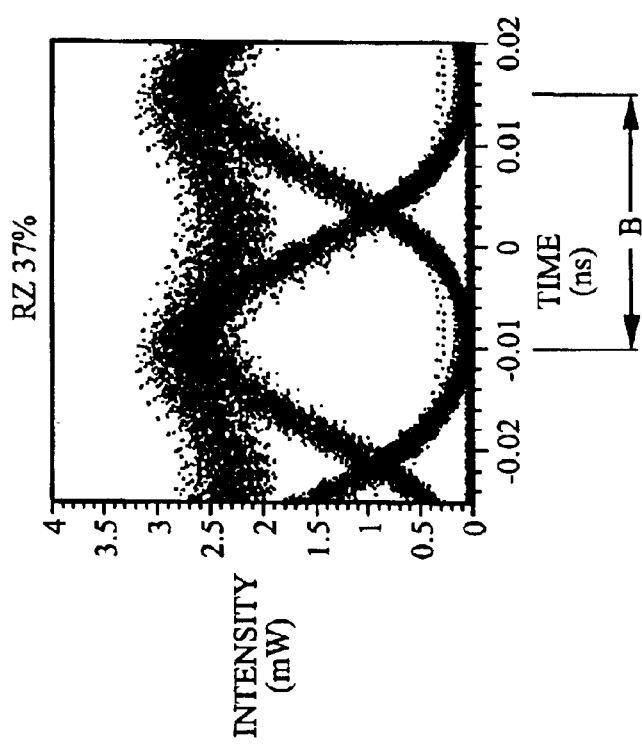
FIGS. 17A–B are comparisons of eye diagrams of alphaRZ-1 pulse generation using the device 16 of FIG. 10 and RZ 37% pulse generation of the device 16 of FIG. 2 with the second MZI 160 formatted for RZ after propagation through the 40 Gb/s system with +30 ps/nm net residual dispersion, in accordance with the present invention.
Figure 17B:
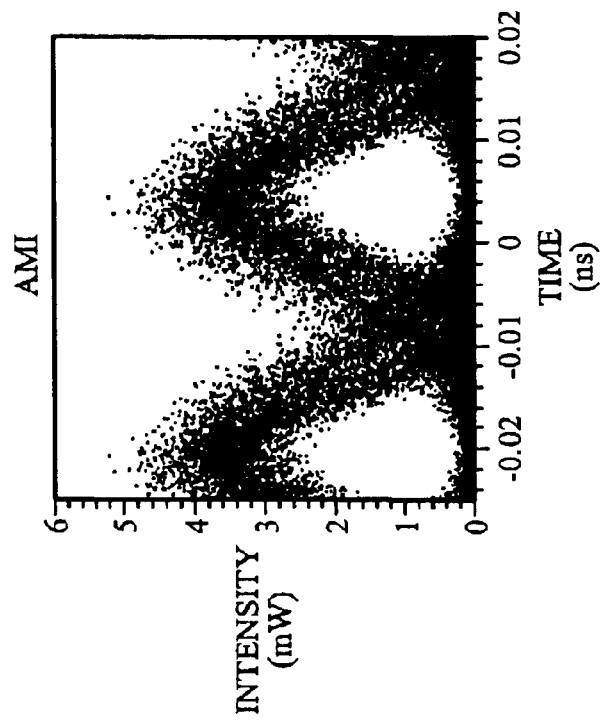

FIGS. 16A–B show eye diagrams of AMI and CSRZ 33% (or CSRZ-4) at the end of the same 40 Gb/s system for the case with −30 ps/nm residual dispersion. Similar eye diagrams for the case with +30 ps/nm residual dispersion are shown in FIGS. 17A–B, but this time comparing AMI with RZ 37% (or RZ-1). Optimized RZ and CSRZ duty cycles clearly lead to much less noisy eye diagrams (and thereby much higher Q values) compared to AMI.

This large performance enhancement of FIGS. 16–17 of the CSRZ 33% and RZ 37% pulses comes without the added complexity of AMI encoding hardware. However, if AMI implementation is not an issue, the performance of AMI may be improved by up to 2.4 dBQ by passing the AMI-encoded signal through a variable duty cycle RZ modulator, which produces alphaRZ-1 pulses, as described in Example 10 and seen in FIG. 10. FIG. 15 shows that variable duty cycle alphaRZ-1 significantly out performs AMI alone (without the variable duty cycle of the RZ modulator of the present invention) at all levels of residual dispersion, and it provides even better performance than optimized RZ and CSRZ over a broad range of residual dispersion values. The enhanced performance of all of these variable duty cycle RZ formats comes from optimizing between the competing effects of eye-closure penalty, spectral broadening (linear cross-talk), and inter-channel and intra-channel nonlinearities presented by the system.

In summary, the present invention teaches a method of generating variable duty cycle pulses by applying specific bias and swing voltages to a Mach-Zehnder modulator. Specifically, a lithium niobate pulse width shaper is taught to shape RZ pulses with an adjustable duty cycle which does not suffer from extinction ratio penalties. Various encoding or modulating formats are exemplified, such as producing tunable duty-cycle RZ pulses with standard RZ, carrier-suppressed RZ (CSRZ), alphaRZ-1, duobinary RZ or other formats. The present invention teaches the critical relationship between the bias and swing (driving) voltages that are applied to a Mach-Zehnder modulator in order to produce the variable duty cycle RZ pulses. When the bias and swing are thus fine-tuned to a specific bias condition, the transmission performance is substantially enhanced compared to standard 50% RZ. The specific duty cycle for which benefit obtained is preferably between 37% and 41%. The drivers for applying the drive signals are at data modulation frequency only, and are not required to operate at subharmonics to minimize distortion. The swing required is substantially lower than in traditional RZ modulators, with a substantially lower voltage/power ratio required. The overall resultant optical bandwidth is lower, achieving lower adjacent channel cross-talk for enhancing optical transmission.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An apparatus for impressing an optical beam, the apparatus comprising:

a DC power supply generating a DC voltage;

a voltage control unit (VCU) generating an AC voltage;

an electro-optic field modulator configuration coupled to receive the optical beam and the DC and AC voltages from the DC power supply and the VCU, the electro-optic field modulator configuration modulating the received optical beam based on the DC and AC voltages applied to the electro-optic field modulator configuration to produce an optical signal of tuned duty cycle pulses having an output power corresponding to an output power versus drive voltage curve with a characteristic half-wave voltage, Vpi, situated midway between a pair of zero power transmittance derivative power points on the curve, wherein the output power satisfies the criteria of having a single maximum value within the bit slot, minimum values at the bit boundaries, and zero derivatives of the output power with respect to time only at the maximum value within the bit slot and the minimum values at the bit boundaries, the tuned duty cycle pulses
    having a duty cycle defined by the magnitudes of the DC and AC voltages and a frequency defined by the frequency of the AC voltage for providing a predetermined amount of destructive optical interference for tuning the duty cycle and the duty cycle is inversely related to the bit period; and
    a controller coupled to the DC power supply and the VCU, the controller generating at least one control signal to control respective magnitudes of the DC and AC voltages for setting the AC voltage and setting the DC voltage such that the maximum power transmittance point on the curve is less than 100% for tuning the duty cycle.

2. The apparatus of claim 1 wherein the electro-optic field modulator comprises:
    a first portion for receiving the optical beam; and
    a Mach-Zehnder interferometer portion having a first arm and a second arm for branching the optical beam from the first portion to propagate the branched optical beam, respectively, in the first and second arms, a light output end for synthesizing the branched light propagated through the first and second arms to output the resultant optical signal having the duty cycle defined by the magnitudes of the DC and AC voltages and the frequency defined by the frequency of the AC voltage for providing the predetermined amount of destructive optical interference for tuning the duty cycle, and an at least one unbalanced driving electrode for applying a drive signal including the DC and AC voltages to at least one of the arms such that the difference between the voltages of the two arms is equal to the sum of the DC voltage and twice the AC voltage.

3. The apparatus of claim 2, wherein the DC voltage is between an inflection point and a half-wave point of the output power versus drive voltage characteristic curve and the AC voltage comprises a sinusoidally varying voltage having a frequency equal to the bit rate of the optical signal and a peak voltage equal to the magnitude of the difference between Vpi and the remainder of the DC voltage when divided by twice Vpi and wherein the resultant optical signal consists of optical pulses having an intensity with a return-to-zero (RZ) shape with a prescribed pulse width that depends on the amount of destructive optical interference between the first and second arms as tuned by the DC and AC voltages. (RZ)

4. The apparatus of claim 2, wherein the DC voltage is at a half-wave point of the output power versus drive voltage characteristic curve and the AC voltage comprises a sinusoidally varying voltage having a frequency equal to half the bit rate of the optical signal and a peak voltage less than Vpi and wherein the resultant optical signal consists of optical pulses having an intensity with a carrier suppressed return-to-zero (CSRZ) shape with a prescribed pulse width that depends on the amount of destructive optical interference between the first and second arms as tuned by the peak of the AC voltage. (CSRZ)

5. The apparatus of claim 3, wherein either the incoming optical beam is modulated using a nonreturn-to-zero (NRZ) data stream or the output optical signal is modulated with the NRZ data stream, the output of the combined setup being optical pulses having an intensity with an RZ shape with a prescribed pulse width that depends on the amount of destructive optical interference between the first and second arms as tuned by the DC and AC voltages and this pulse width corresponding to a duty cycle that ranges between about 37% and 50%. (RZ-1)

6. The apparatus of claim 3, wherein either the incoming optical beam is modulated using a standard return-to-zero (RZ) data stream having a duty cycle of 50% (type I) or a standard RZ data stream having a duty cycle of 33% (type II) or the output optical signal is modulated with one of the aforementioned RZ data streams, the output of the combined setup being optical pulses having an intensity with an RZ shape with a prescribed pulse width that depends on the amount of destructive optical interference between the first and second arms as tuned by the DC and AC voltages such that this pulsewidth corresponds to a duty cycle that ranges from about 32.5% and 41% in the case when the data stream is of type I and a duty cycle that ranges from about 25% and 31% in the case when the data stream is of type II (RZ-2)

7. The apparatus of claim 3, wherein either the incoming optical beam is modulated using a standard carrier-suppressed return-to-zero (CSRZ) data stream having a duty cycle of 67% or the output optical signal is modulated with said CSRZ data stream, the output of the combined setup being optical pulses having a field amplitude with a CSRZ shape with a prescribed pulse width that depends on the amount of destructive optical interference between the first and second arms as tuned by the DC and AC voltages such that the pulse width corresponds to a duty cycle that ranges from about 38% and 46%. (CSRZ-1)

8. The apparatus of claim 3, wherein either the incoming optical beam is modulated using a phase-shift keyed (PSK) data stream or the output optical signal is modulated with said PSK data stream, the output of the combined setup being optical pulses having a phase modulation governed by the said PSK data stream and an intensity with an RZ shape with a prescribed pulse width that depends on the amount of destructive optical interference between the first and second arms as tuned by the DC and AC voltages such that this pulse width corresponding to a duty cycle that ranges between about 37% and 50%. (RZ-PSK)

9. The apparatus of claim 3, wherein either the incoming optical beam is modulated using an alternate mark inversion (AMI) data stream or the output optical signal is modulated with said AMI data stream, the output of the combined setup being optical pulses having an alternate phase modulation governed by the said AMI data stream and an intensity with an RZ shape with a prescribed pulse width that depends on the amount of destructive optical interference between the first and second arms as tuned by the DC and AC voltages such that this pulse width corresponds to a duty cycle that ranges between about 37% and 50%. (alphaRZ-1)

10. The apparatus of claim 3, wherein either the incoming optical beam is modulated using a duobinary data stream or the output optical signal is modulated with said duobinary data stream, the output of the combined setup being optical pulses having phase shifts governed by the said duobinary data stream and an intensity with an RZ shape with a prescribed pulse width that depends on the amount of destructive optical interference between the first and second arms as tuned by the DC and AC voltages such that this pulse width corresponds to a duty cycle that ranges between about 37% and 50%. (Duobinary-RZ)

11. The apparatus of claim 5, further comprising a second apparatus wherein the incoming optical beam is the output of the second apparatus, the output of the combined setup being optical pulses having an intensity with an RZ shape with a prescribed pulse width that depends on the amount of destructive optical interference between the first and second arms of at least one of the apparatuses as tuned by the DC and AC voltages such that this pulse width corresponds to a duty cycle that ranges between about 26% and 41%. (RZ-3)

12. The apparatus of claim 4, wherein either the incoming optical beam is modulated using a nonreturn-to-zero (NRZ) data stream or the output optical signal is modulated with said NRZ data stream, the output of the combined setup being optical pulses having a field amplitude with a CSRZ shape with a prescribed pulse width that depends on the amount of destructive optical interference between the first and second arms as tuned by the peak of the AC voltage such that this pulse width corresponds to a duty cycle that ranges between about 50% and 67%. (CSRZ-2)

13. The apparatus of claim 4, wherein either the incoming optical beam is modulated using a standard return-to-zero (RZ) data stream with a duty cycle of 50% or the output optical signal is modulated with said RZ data stream, the output of the combined setup being optical pulses having a field amplitude with a CSRZ shape with a prescribed pulse width that depends on the amount of destructive optical interference between the first and second arms as tuned by the peak of the AC voltage such that this pulse width corresponds to a duty cycle that ranges between about 39% and 46%. (CSRZ-3)

14. The apparatus of claim 4, wherein either the incoming optical beam is modulated using a standard carrier-suppressed return-to-zero (CSRZ) data stream with a duty cycle of 67% or the output optical signal is modulated with said CSRZ data stream, the output of the combined setup being optical pulses having an intensity with an RZ shape with a prescribed pulse width that depends on the amount of destructive optical interference between the first and second arms as tuned by the peak of the AC voltage such that this pulse width corresponds to a duty cycle that ranges between about 45% and 56%. (RZ-4)

15. The apparatus of claim 4, further comprising a duobinary modulator for providing either an incoming optical beam modulated using a duobinary data stream or an output optical signal modulated with the duobinary data stream for the apparatus, the output of the combined setup being optical pulses having an alternate phase modulation governed by the duobinary data stream and phase modulation of the apparatus, the pulses having a prescribed pulse width that depends on the amount of destructive optical interference between the first and second arms of the apparatus as tuned by the peak of the AC voltage such that this pulse width corresponds to a duty cycle that ranges between about 50% and 67%. (alphaRZ-2)

16. The apparatus of claim 4, further comprising a second apparatus wherein the incoming optical beam is the output of the second apparatus, the output of the combined setup being optical pulses having an intensity with an RZ shape with a prescribed pulse width that depends on the amount of destructive optical interference between the first and second arms of at least one of the apparatuses as tuned by the peaks of the AC voltages such that this pulse width corresponds to a duty cycle that ranges between about 36% and 56%. (RZ-5)

17. The apparatus of claim 2, further comprising a second apparatus wherein the DC voltage is at a half-wave point of the output power versus drive voltage characteristic curve and the AC voltage comprises a sinusoidally varying voltage having a frequency equal to half the bit rate of the optical signal and a peak voltage less than Vpi for providing a resultant optical signal consisting of optical pulses having an intensity with a carrier suppressed return-to-zero (CSRZ) shape with a prescribed pulse width that depends on the amount of destructive optical interference between the first and second arms as tuned by the peak of the AC voltage for providing the CSRZ shape either as an incoming optical beam or an output optical signal for coupling as an input to the first apparatus, the output of the combined setup being optical pulses having a field amplitude with a CSRZ shape with a prescribed pulse width that depends on the amount of destructive optical interference between the first and second arms as tuned by the peak of the AC voltage of the second apparatus and the DC and AC voltages of the apparatus of first apparatus such that this pulse width corresponds to a duty cycle that ranges between about 30% and 46%. (CSRZ-4)

18. The apparatus of claim 1, further comprising at least one hybrid fiber span having a first length of positive dispersion fiber, a second length of positive dispersion fiber, and a third length of negative dispersion fiber wherein the third length of negative dispersion fiber is optically coupled between the first and second lengths of positive dispersion fibers for use in a telecommunications system that transmits the tuned duty cycle pulses.

19. A method for modulating an optical signal and tuning the duty cycle of the optical signal in a Mach-Zehnder interferometer having a power transfer function of the interferometer for optimizing system performance as a response of the duty cycle, the method comprising the steps of:

generating a DC voltage;

generating an AC voltage; and biasing and controlling the swing of the Mach-Zehnder interferometer with the respective amplitudes of the DC and AC voltages such that the maximum power transmittance point on the transfer function is less than 100% for tuning the duty cycle of the optical signal such that system performance is optimized.

20. A device in a system for modulating an optical signal and tuning the duty cycle of the optical signal for optimizing system performance as a response of the duty cycle, the device comprising:

a tunable duty-cycle Mach-Zehnder interferometer (MZI) for modulating the optical signal and tuning the duty cycle of the optical signal, the MZI having a power transfer function of the interferometer; and at least one electrode structure for generating a DC voltage and an AC voltage for biasing and controlling the swing of the Mach-Zehnder interferometer with the respective amplitudes of the DC and AC voltages such that the maximum power transmittance point on the transfer function is less than 100% for tuning the duty cycle of the optical signal such that system performance is optimized.

* * * * *